US012068887B2

(12) United States Patent
Wang et al.

(10) Patent No.: US 12,068,887 B2
(45) Date of Patent: Aug. 20, 2024

(54) DATA TRANSMISSION METHOD, APPARATUS, AND NETWORK DEVICE

(71) Applicant: Huawei Technologies Co., Ltd., Shenzhen (CN)

(72) Inventors: Haibo Wang, Beijing (CN); Shunwan Zhuang, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 17/466,517

(22) Filed: Sep. 3, 2021

(65) Prior Publication Data

US 2022/0078046 A1 Mar. 10, 2022

(30) Foreign Application Priority Data

Sep. 4, 2020 (CN) .......................... 202010920439.1
Jan. 19, 2021 (CN) .......................... 202110071538.1

(51) Int. Cl.
*H04L 12/46* (2006.01)
*H04L 45/74* (2022.01)

(52) U.S. Cl.
CPC .......... *H04L 12/4641* (2013.01); *H04L 45/74* (2013.01)

(58) Field of Classification Search
CPC .................................................. H04L 12/4633
See application file for complete search history.

(56) References Cited

U.S. PATENT DOCUMENTS

| 10,291,532 | B1* | 5/2019 | Tiruveedhula | ........ H04L 47/125 |
| 2011/0179163 | A1* | 7/2011 | Masputra | .............. G06F 1/3203 |
| | | | | 709/224 |
| 2020/0195551 | A1 | 6/2020 | Li | |
| 2020/0382420 | A1* | 12/2020 | Suryanarayana | ....... H04L 45/34 |
| 2021/0203586 | A1 | 7/2021 | Liu et al. | |
| 2021/0218598 | A1* | 7/2021 | Ganapathy | .............. H04L 45/64 |

FOREIGN PATENT DOCUMENTS

| CN | 107018076 A | 8/2017 |
| CN | 110912796 A | 3/2020 |
| CN | 111585899 A | 8/2020 |
| EP | 3840304 A1 | 6/2021 |

* cited by examiner

*Primary Examiner* — Mansour Oveissi
(74) *Attorney, Agent, or Firm* — Conley Rose, P.C.

(57) ABSTRACT

A data transmission method includes sending, by a third network device, a first route to a first network device based on a fact that the first network device is a first-mode neighbor of the third network device or based on a request received from the first network device, and forwarding, by the first network device based on the first route, a packet to be sent to a second user-side device connected to a second network device.

20 Claims, 19 Drawing Sheets

DATA TRANSMISSION METHOD, APPARATUS, AND NETWORK DEVICE

CROSS-REFERENCE TO RELATED APPLICATIONS

This application claims priority to Chinese Patent Application No. 202010920439.1 filed on Sep. 4, 2020 and Chinese Patent Application No. 202110071538.1 filed on Jan. 19, 2021. Both of the aforementioned applications are hereby incorporated by reference in their entireties.

TECHNICAL FIELD

This application relates to the communications field, and in particular, to a data transmission method, an apparatus, and a network device.

BACKGROUND

A network device in a local area network deployed as a tree network may propagate a route of the network device in the local area network by using a Border Gateway Protocol (BGP), to transmit a data packet between network devices. Because BGP is featured in route flooding, each network device in the local area network stores a broadcast routing table and a unicast routing table. However, to reduce costs, a customer edge (CE) node (that is, a network device close to a user side) in the tree network usually has relatively low memory and a relatively low processing capability. Because the customer edge node stores routing information of another network device in the tree network, the customer edge node has relatively high resource overheads for processing data packets and relatively high pressure for storing a routing table. Therefore, how to reduce resource overheads and storage pressure of the customer edge node is an urgent problem to be resolved.

SUMMARY

This application provides a data transmission method, an apparatus, and a network device, to resolve a problem of how to reduce resource overheads and storage pressure of a customer edge node.

According to a first aspect, this application provides a data transmission method. The method may be applied to an Ethernet virtual private network (EVPN) system, and the system includes a first network device, a second network device, and a third network device. The third network device establishes a first-mode neighbor with each of the first network device and the second network device, the first network device is connected to a first user-side device, and the second network device is connected to a second user-side device. The method is performed by the third network device, or the method may be applied to a communications apparatus that supports the third network device in implementing the method. For example, the communications apparatus includes a chip system. The method includes that the third network device obtains a first route based on a fact that the first network device is the first-mode neighbor of the third network device or based on a request received from the first network device, and sends the first route to the first network device, where the first route is used to instruct the first network device to forward, based on the first route, a packet to be sent to the second user-side device connected to the second network device. Therefore, the first network device stores only a default route to be sent to the third network device, and the third network device forwards, based on a fact that the first network device is a spoke neighbor of the third network device, a packet sent by the first network device, or the first network device does not prestore a route to a user-side device mounted on the second network device, but obtains a corresponding route of a user-side device from the third network device based on a requirement. This reduces resource overheads and storage pressure of the first network device.

In a possible implementation, that the third network device obtains a first route based on a fact that the first network device is the first-mode neighbor of the third network device includes that the third network device generates the first route based on a fact that the first network device is the first-mode neighbor of the third network device, where the first route is used to instruct the first network device to forward, to the third network device based on the first route, the packet to be sent to the second user-side device, and the first route may be, for example, an unknown media access control (MAC) route (UMR).

In another possible implementation, that the third network device obtains a first route based on a request received from the first network device includes that the third network device receives the request from the first network device, where the request is a request used to obtain a route to the second user-side device, and the request is a request generated by the first network device or a request that is generated by the first user-side device and that is forwarded by the first network device, and obtains the first route based on the request, where the first route is used to instruct the first network device to forward, to the second network device based on the first route, the packet to be sent to the second user-side device. A destination address of the first route is an address of the second user-side device, and a next hop of the first route is an address of the second network device. After obtaining the first route, the first network device may directly send, to the second network device by using the first route, the packet that needs to be sent to the second user-side device.

Therefore, the first network device dynamically requests a route based on unicast traffic of a service to accurately request the route, and sends a packet based on the requested route to implement an optimal path. In this way, the first network device does not need to maintain a large quantity of routes, and a quantity of routes stored in the first network device is controlled, to significantly reduce resource overheads and storage pressure of the first network device. In addition, after the requested route is obtained, the packet sent by the first network device does not need to be forwarded by the third network device. This also helps balance a service path in a service scenario such as a frequent service transaction scenario.

The method further includes that the third network device receives a first packet sent by the first network device based on the first route, and forwards the first packet to the second network device, where the first packet is a packet sent by the first user-side device connected to the first network device to the second user-side device, and the first packet may be a unicast packet.

In addition, the method further includes that the third network device receives a second route sent by the second network device, and receives a third route sent by the first network device, where the second route is used to instruct the third network device to forward the packet to be sent to the second user-side device, and the third route is used to instruct the third network device to forward a packet to be sent to the first user-side device.

Further, after receiving the first packet sent by the first network device based on the first route, the third network device may forward the first packet to the second network device based on the second route.

In another possible implementation, the first network device is directly or indirectly connected to the first user-side device, and the second network device is directly or indirectly connected to the second user-side device. When the first network device is directly connected to the first user-side device, the first network device may be a customer edge network device, and is configured to be directly connected to a user-side device such as a user host to provide a network service. When the second network device is directly connected to the second user-side device, the second network device may also be a customer edge network device. The first network device is used as an example. In this direct connection manner, the first network device may obtain a default route from the third network device, so as to send, by using the third network device, a packet from the first user-side device to the second user-side device connected to the second network device. Alternatively, in this direct connection manner, the first network device may send a request to the third network device to obtain the first route, so as to directly send the packet to the second user-side device based on the first route.

When the first network device is indirectly connected to the first user-side device, the first network device may alternatively be a network-side network device. For example, the first network device may be connected to the first user-side device by using a first customer edge network device. Similarly, the second network device may also be connected to the second user-side device by using a second customer edge network device. The first network device is still used as an example. In this indirect connection manner, the first network device and the first customer edge network device may establish a first-mode neighbor, and the third network device and the first network device may also establish a first-mode neighbor, so as to establish a multi-level hierarchical structure. The first network device may obtain the first route from the third network device, where the first route is, for example, a UMR, and forward the UMR to the first customer edge network device, to finally send, by using the third network device, the packet from the first user-side device to the second user-side device connected to the second network device. Alternatively, in this indirect connection manner, the first network device may send, to the first network device by using the first customer edge network device, the request used to obtain the first route. After receiving the request, the first network device may generate an updated request based on the request, to request to obtain the first route from the third network device, so that the first customer edge network device or the first network device directly sends the packet to the second user-side device based on the first route.

It may be considered that a function similar to that of a route reflector is implemented in the process in which the first network device obtains the first route from the third network device and forwards the first route to the first customer edge network device.

In addition, the first network device may further obtain one or more requests used to obtain a route, where the one or more requests may be sent from one or more user-side devices. The first network device may generate a new request based on the one or more requests, and forward the new request to the third network device, to obtain one or more routes corresponding to the one or more requests from the third network device, and forward the one or more routes to the first customer edge network device, so that the first customer edge network device forwards the packet from the user-side device based on the one or more routes.

In another possible implementation, the method further includes that the third network device may negotiate a quantity of outbound route filtering (ORF) requests with the first network device. The third network device may negotiate a quantity of ORF requests with the second network device, where the ORF request is used to request a route of a user-side device connected to a network device. After the third network device receives ORF requests whose quantity is greater than a threshold, the third network device discards a redundant quantity of ORF requests.

According to a second aspect, this application provides a data transmission method. The method may be applied to an EVPN system, and the system includes a first network device, a second network device, and a third network device. The third network device establishes a first-mode neighbor with each of the first network device and the second network device, the first network device is connected to a first user-side device, and the second network device is connected to a second user-side device. The method is performed by the first network device, or the method may be applied to a communications apparatus that supports the first network device in implementing the method. For example, the communications apparatus includes a chip system. The method includes that the first network device receives a first route from the third network device, where the first route is used to instruct the first network device to forward a packet from the first user-side device based on the first route, and the first network device further receives a first packet sent by the first user-side device, and forwards the first packet based on the first route, where the first packet is a packet to be sent to the second user-side device. Therefore, the first network device stores only a default route to be sent to the third network device, and the third network device forwards, based on a fact that the first network device is a spoke neighbor of the third network device, a packet sent by the first network device, or the first network device does not prestore a route to a user-side device mounted on the second network device, but obtains a corresponding route of a user-side device from the third network device based on a requirement. This reduces resource overheads and storage pressure of the first network device.

In a possible implementation, that a first route is received from the third network device includes receiving the first route generated and sent by the third network device, and that the first packet is forwarded based on the first route includes forwarding the first packet to the third network device by using the first route when a MAC address of the second user-side device is not found.

In another possible implementation, that a first route is received from the third network device includes receiving, from the third network device based on a request sent to the third network device, the first route in response to the request, where the request is a request used to obtain a route to the second user-side device, and that the first packet is forwarded based on the first route includes forwarding, based on the first route, the first packet to the second network device connected to the second user-side device.

In another possible implementation, the first route is a route of the second user-side device, and the method further includes deleting the first route after a preset period of time. In this way, this avoids a problem that storage pressure of the first network device is increased because the first network device stores a relatively large amount of routing information.

In addition, before the first network device receives the first route sent by the third network device, the method further includes that the first network device sends a second route to the third network device, where the second route is used to instruct the third network device to forward a packet to the first user-side device.

In another possible implementation, the first network device is directly or indirectly connected to the first user-side device, and the second network device is directly or indirectly connected to the second user-side device.

According to a third aspect, this application provides a data transmission method. The method may be applied to an EVPN system, and the system includes a first network device, a second network device, and a third network device. The third network device establishes a first-mode neighbor with each of the first network device and the second network device, the first network device is connected to a first user-side device, and the second network device is connected to a second user-side device. The method is performed by the third network device, or the method may be applied to a communications apparatus that supports the third network device in implementing the method. For example, the communications apparatus includes a chip system. The method includes that the third network device receives a first route from the first network device, and receives a first packet from the second user-side device connected to the second network device, and the third network device forwards the first packet to the first network device based on the first route when the first network device is the first-mode neighbor of the third network device, where the first route is a first inclusive multicast Ethernet tag (IMET) route, and the first route is used to forward a packet to the first user-side device, and the first-mode neighbor may be, for example, a spoke neighbor.

In this way, both the first network device and the second network device store only the IMET route of the third network device, but do not need to store an IMET route of another network device. This effectively reduces resource overheads and storage pressure of the customer edge node.

In a possible implementation, the method further includes that the third network device receives a second route from the second network device, where the second route is a second IMET route, and the second route is used to forward a packet to the second user-side device.

It should be noted that the third network device does not forward the second route to the first network device based on a fact that the first network device is the first-mode neighbor of the third network device, and the third network device does not forward the first route to the second network device based on a fact that the second network device is the first-mode neighbor of the third network device.

In addition, the third network device does not forward the first packet to the second network device based on a fact that the second network device is the first-mode neighbor of the third network device and a fact that the first packet is from the second network device.

In another possible implementation, before the third network device receives the first packet from the second user-side device connected to the second network device, the method further includes advertising a third IMET route to the second network device, to instruct the second network device to send the first packet to the third network device based on the third IMET route.

In another possible implementation, the method further includes advertising a third IMET route to the first network device, to instruct the first network device to send a second packet to the third network device based on the third IMET route, where the second packet is a packet from the first user-side device connected to the first network device.

The first packet and the second packet each are a broadcast, unknown unicast, and multicast (BUM) packet. To be specific, the first packet and the second packet each are any one of a broadcast packet, an unknown unicast packet, or a multicast packet.

In another possible implementation, the first network device is directly or indirectly connected to the first user-side device, and the second network device is directly or indirectly connected to the second user-side device. When the first network device is directly connected to the first user-side device, the first network device may be a customer edge network device, and is configured to be directly connected to a user-side device such as a user host to provide a network service. When the second network device is directly connected to the second user-side device, the second network device may also be a customer edge network device. The first network device is used as an example. In this direct connection manner, the first network device may obtain, from the third network device, the IMET route advertised by the third network device, so as to send, by using the third network device, a packet from the first user-side device to the second user-side device connected to the second network device. When the first network device is indirectly connected to the first user-side device, the first network device may alternatively be a network-side network device. For example, the first network device may be connected to the first user-side device by using a first customer edge network device. Similarly, the second network device may also be connected to the second user-side device by using a second customer edge network device. The first network device is still used as an example. In this indirect connection manner, the first network device and the first customer edge network device may establish a first-mode neighbor, and the third network device and the first network device may also establish a first-mode neighbor, so as to establish a multi-level hierarchical structure. The first network device may obtain the IMET route from the third network device, and forward the IMET route to the first customer edge network device, to finally send, by using the third network device, a packet from the first user-side device to the second user-side device connected to the second network device.

It may be considered that a function similar to that of a route reflector is implemented in the process in which the first network device obtains the IMET route from the third network device and forwards the IMET route to the first customer edge network device.

According to a fourth aspect, this application provides a data transmission method. The method may be applied to an EVPN system, and the system includes a first network device, a second network device, and a third network device. The third network device establishes a first-mode neighbor with each of the first network device and the second network device, the first network device is connected to a first user-side device, and the second network device is connected to a second user-side device. The method is performed by the first network device, or the method may be applied to a communications apparatus that supports the first network device in implementing the method. For example, the communications apparatus includes a chip system. The method includes that the first network device sends a first route to the third network device based on a fact that the first network device is the first-mode neighbor of the third network device. The first network device further receives a first packet sent by the third network device, where the first packet is a packet from the second user-side device connected to the second network device, and the first route is a first IMET route, and the first route is used to forward a packet to the first user-side device.

In addition, the first network device does not send the first route to the second network device based on a fact that the first network device is not the first-mode neighbor of the second network device, where the first-mode neighbor is, for example, a spoke neighbor.

In another possible implementation, the first network device is directly or indirectly connected to the first user-side device, and the second network device is directly or indirectly connected to the second user-side device.

According to a fifth aspect, this application provides a communications apparatus. For beneficial effects, refer to the descriptions according to any one of the first aspect to the fourth aspect. Details are not described herein again. The communications apparatus has a function of implementing behavior in the method instance according to any one of the first aspect to the fourth aspect. The function may be implemented by hardware, or may be implemented by hardware executing corresponding software. The hardware or the software includes one or more modules corresponding to the function. In a possible design, the communications apparatus includes a receiving unit, a processing unit, and a sending unit. In an example, the communications apparatus is configured to implement a function of the third network device. Further, the processing unit is configured to generate a first route. The sending unit is configured to send the first route to each of the first network device and the second network device. The receiving unit is configured to receive a second route sent by the first network device, and receive a third route sent by the second network device. The route may be a MAC route or an IMET route. In addition, the receiving unit is further configured to receive a first packet sent by the first network device. The sending unit is configured to forward the first packet to the second network device based on the third route. The receiving unit is further configured to receive a second packet sent by the second network device. The sending unit is configured to forward the second packet to the first network device based on the second route. The packet may be a unicast packet or a BUM packet. These modules may perform corresponding functions in the method example according to any one of the first aspect to the fourth aspect. For details, refer to the detailed descriptions in the method example. The details are not described herein again.

According to a sixth aspect, this application provides a network device. The network device may be each network device in the foregoing method embodiments, or may be a chip disposed in the network device. The network device includes an interface circuit and a processor, and optionally, further includes a memory. The memory is configured to store a computer program or instructions. The processor is coupled to the memory and the interface circuit. When the processor executes the computer program or the instructions, the network device is enabled to perform a corresponding method performed by each network device in the foregoing method embodiments.

According to a seventh aspect, this application provides a computer program product. The computer program product includes computer program code, and when the computer program code is run, the methods performed by the network device in the foregoing aspects are performed.

According to an eighth aspect, this application provides a chip system. The chip system includes a processor, configured to implement functions of the network devices in the methods in the foregoing aspects. In a possible design, the chip system further includes a memory, configured to store program instructions and/or data. The chip system may include a chip, or may include a chip and another discrete component.

According to a ninth aspect, this application provides a computer readable storage medium. The computer readable storage medium stores a computer program, and when the computer program is run, the methods performed by the network devices in the foregoing aspects are implemented.

DESCRIPTION OF EMBODIMENTS

Currently, large-scale, virtualization, and cloud computing have become network development trends, to integrate information technology (IT) resources, improve resource utilization, reduce maintenance costs, and the like. With rapid development of network virtualization implemented on a physical network infrastructure, a quantity of virtual machines (VMs) on a physical device continuously increases, and a quantity of applications running in a virtualized environment also continuously increases. An architecture of a physical network limits a development scale of the virtual machine. This brings great challenges to a virtual network. As one of network virtualization over layer 3 L3) (NVo3) technologies, a VXLAN technology has strong adaptability, and provides a good solution for network virtualization.

A VXLAN tunnel endpoint (VTEP) in a VXLAN encapsulates, by using a User Datagram Protocol (UDP), a data packet sent by a source virtual machine, to obtain a VXLAN packet. An Internet Protocol (IP) address and a MAC address of a VTEP in a physical network are used as an outer header in the VXLAN packet. A source IP address in the VXLAN packet is an address of a local VTEP on a VXLAN tunnel, and a destination IP address in the VXLAN packet is an address of a peer VTEP on the VXLAN tunnel. The VXLAN packet is transmitted on the VXLAN tunnel established by the pair of VTEPs on an IP network. The peer VXLAN tunnel endpoint on the VXLAN tunnel decapsulates the VXLAN packet and sends data to a destination virtual machine. In this way, the physical network is decoupled from the virtual network. In addition, a tenant can plan a virtual network of the tenant without considering limitations of a physical network IP address and a broadcast domain. This greatly simplifies network management.

Figure 1:
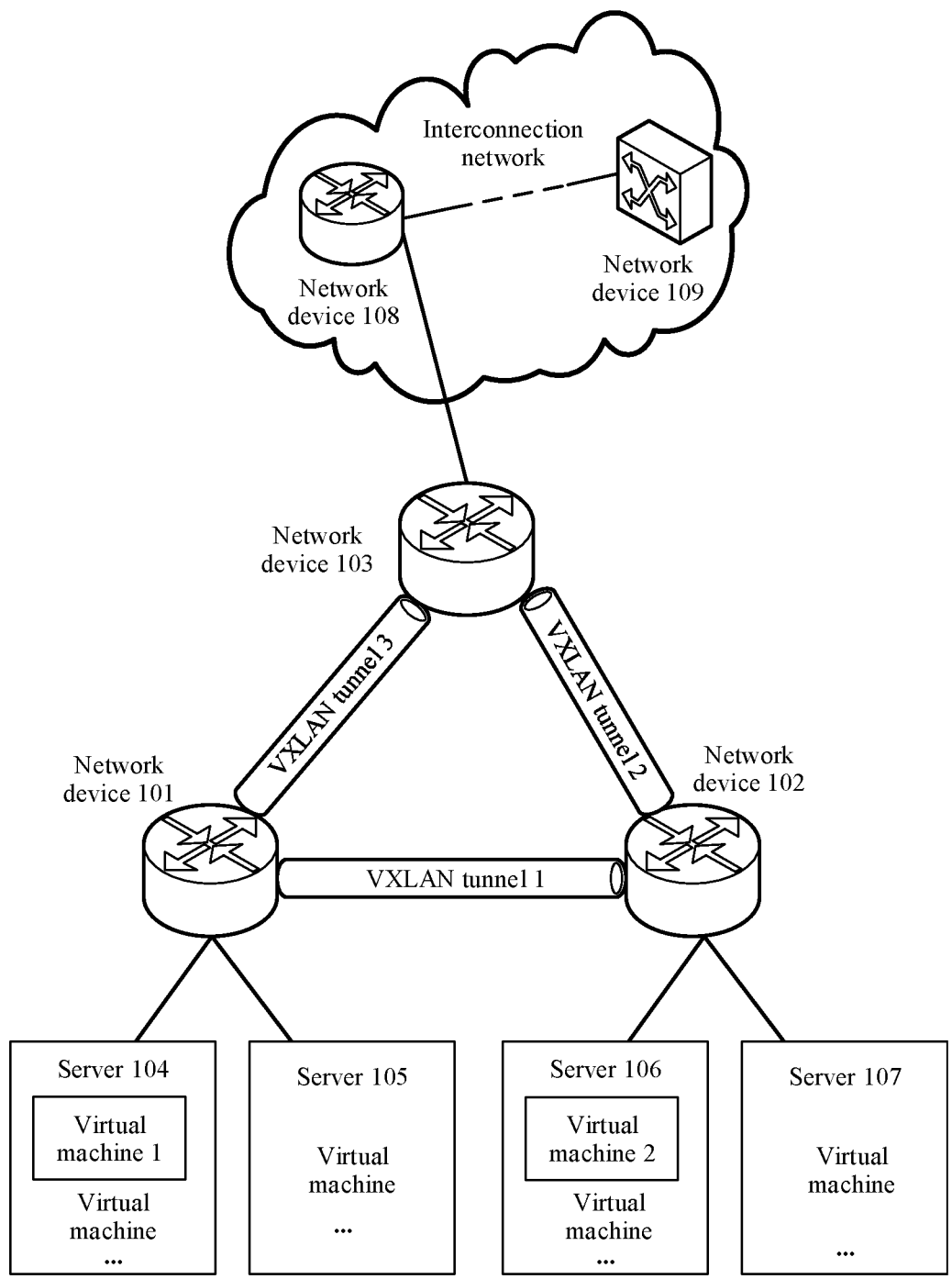
FIG. 1 is a simplified schematic structural diagram of a Virtual Extensible Local Area Network (LAN) (VXLAN) according to an embodiment of this application.

For example, FIG. 1 is a simplified schematic structural diagram of a VXLAN according to an embodiment of this application. As shown in FIG. 1, the VXLAN includes a network device 101, a network device 102, and a network device 103. The network device 101, the network device 102, and the network device 103 may be connected to each other through a physical medium. The network device 101, the network device 102, and the network device 103 are three different VXLAN tunnel endpoints. The network device 101 and the network device 102 establish a VXLAN tunnel 1. The network device 102 and the network device 103 establish a VXLAN tunnel 2. The network device 103 and the network device 101 establish a VXLAN tunnel 3. The network device 103 may access another network (for example, an interconnection network). For example, the network device 103 may be a gateway device in the VXLAN, and the network device 103 is connected to a network device 108 in the interconnection network. In this case, a packet in the VXLAN may be transmitted to a network outside the VXLAN by using the network device 103. The network device 101 is connected to a server 104 and a server 105. The network device 102 is connected to a server 106 and a server 107. Each of the server 104 to the server 107 includes a plurality of virtual machines. It is assumed that a virtual machine in the server 104 sends data to a virtual machine in the server 106. The network device 101 first encapsulates, by using UDP, a data packet sent by the virtual machine in the server 104, to obtain a VXLAN packet, and transmits the VXLAN packet to the network device 102 through the VXLAN tunnel 1 between the network device 101 and the network device 102. The network device 102 decapsulates the VXLAN packet, and transmits data included in the VXLAN packet to the virtual machine in the server 106. The network device 101 and the network device 102 that each are connected to the servers may be referred to as customer edge nodes in the network, and both are connected to the network-side network device 103.

The network device in this embodiment may be a device such as a router or a switch. In addition to the servers shown in FIG. 1, a device connected to a device that accesses the customer edge nodes (for example, the network device 101 and the network device 102) may be another device, for example, a host or a terminal. The terminal may also be referred to as a terminal device, user equipment (UE), a mobile station (MS), a mobile terminal (MT), or the like. The terminal may be a mobile phone, a tablet computer (or IPAD), a computer having a wireless transceiver function, a wearable device, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology used by the terminal and a specific device form of the terminal are not limited in this embodiment of this application. FIG. 1 is merely an example for description. A quantity of network devices and a quantity of servers included in the system are not limited in this embodiment of this application.

Usually, one server may be virtualized into a plurality of virtual machines, and one virtual machine may be considered as one host. Services may be flexibly deployed on virtual machines. A same service may be deployed on virtual machines that belong to a same network segment. Different services may be deployed on virtual machines that belong to different network segments. The virtual machines that belong to the same network segment may communicate with each other. The virtual machines that belong to the different network segments may also communicate with each other. For example, services of a finance department are deployed on virtual machines that are in the server 104 and the server 106 and that belong to a same network segment. For another example, services of an engineering department are deployed on virtual machines that are in the server 105 and the server 107 and that belong to a same network segment. The virtual machines on which the services of the finance department are deployed may communicate with each other. The virtual machines on which the services of the finance department are deployed and the virtual machines on which the services of the engineering department are deployed may also communicate with each other. For another example, services of a human resource department are deployed on a server in a conventional network. The virtual machines on which the services of the finance department are deployed, the virtual machines on which the services of the engineering department are deployed, and the server on which the services of the human resource department are deployed may also communicate with each other.

It should be noted that the VXLAN tunnel endpoint in the VXLAN discovers another VXLAN tunnel endpoint and learns host information by using a broadcast packet. The host information includes an IP address, a MAC address, a VXLAN network identifier (VNI), an IP address of a gateway VTEP, and the like. This results in a large amount of flooding traffic on the network. To resolve this problem, an EVPN technology may be used in the VXLAN, and a new type of network layer reachability information (NLRI), that is, EVPN NLRI, is defined based on the BGP. The EVPN NLRI defines several types of new BGP-EVPN routes (for example, a MAC/IP route, an IMET route, and an IP prefix route). VTEPs exchange the BGP-EVPN route with each other to implement features such as automatic VTEP discovery and host information advertisement.

However, there are a large quantity of customer edge nodes (for example, network devices close to servers) on a large-scale VXLAN network (for example, VXLANs deployed in some large-scale campuses). Even if each customer edge node generates one route, hardware of the customer edge node cannot support such a large quantity of routes.

Therefore, the embodiments of this application provide a solution. In this solution, a network-side node establishes a specific mode neighbor with each customer edge node connected to the network-side node, so that each customer edge node advertises, to the network-side node based on the established mode neighbor, a route of a device (for example, a user host) that implements network communication by using the customer edge node, and all customer edge nodes may no longer need to advertise respective routes to each other, but forward a packet to each other by using the network-side node, or dynamically obtain a route to another customer edge node from the network-side node based on a requirement. This reduces storage pressure and resource overheads of the customer edge node.

The following describes, in detail with reference to the accompanying drawings, a data transmission method provided in this application.

Figure 2:
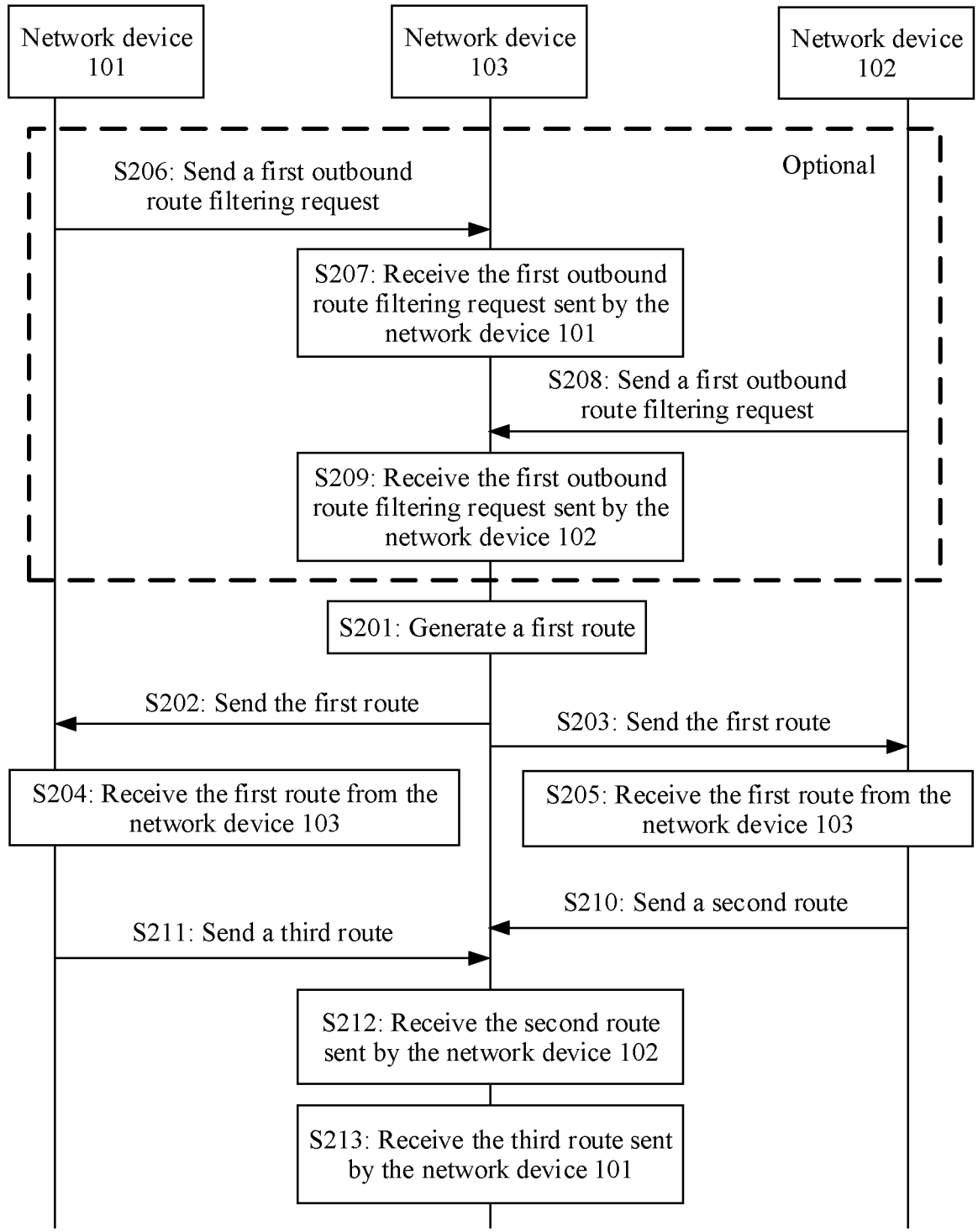
FIG. 2 is a flowchart of a data transmission method according to an embodiment of this application.

FIG. 2 is a flowchart of a data transmission method according to an embodiment of this application. Herein, a network device 101, a network device 102, and a network device 103 are used as examples for description. The network device 103 establishes a first-mode neighbor with each of the network device 101 and the network device 102, where the first-mode neighbor may be a spoke neighbor. As shown in FIG. 2, the method includes the following steps.

S201: The network device 103 generates a first route.

The network device 103 determines, based on stored information about a network device that establishes a spoke neighbor with the network device 103, that the network device 101 is the first-mode neighbor of the network device 103 and the network device 102 is the first-mode neighbor of the network device 103. Further, the network device 103 generates the first route based on a fact that the network device 101 is the first-mode neighbor of the network device 103 and a fact that the network device 102 is the first-mode neighbor of the network device 103.

The first route is used to instruct the network device 101 to forward, to the network device 103 based on the first route, a packet to be sent to a virtual machine connected to the network device 102.

The first route is further used to instruct the network device 102 to forward, to the network device 103 based on the first route, a packet to be sent to a virtual machine connected to the network device 101.

The first route may be a default route. For example, the default route is an UMR, and is represented by a MAC address 0-0-0. The network device 103 advertises the default route, so that a network device that receives the default route can forward, to the network device 103 based on the default route, a service packet that needs to be sent, and then the network device 103 determines, through local table lookup, to forward the received service packet to a next network device.

S202: The network device 103 sends the first route to the network device 101.

The network device 103 sends the first route to the network device 101 based on a spoke-mode BGP-EVPN neighbor relationship with the network device 101.

S203: The network device 103 sends the first route to the network device 102.

The network device 103 sends the first route to the network device 102 based on a spoke-mode BGP-EVPN neighbor relationship with the network device 102.

S204: The network device 101 receives the first route from the network device 103.

After receiving the first route, the network device 101 records the first route in an unknown unicast routing table. After receiving the packet sent by the virtual machine connected to the network device 101, the network device 101 may forward the packet to the network device 103 based on the first route.

S205: The network device 102 receives the first route from the network device 101.

After receiving the first route, the network device 102 records the first route in an unknown unicast routing table. After receiving the packet sent by the virtual machine connected to the network device 102, the network device 102 may forward the packet to the network device 103 based on the first route.

In one case, the first route may be actively sent by the network device 103 based on the first-mode neighbor relationship between the network device 103 and each of the network device 102 and the network device 101. In another case, after receiving a request (for example, an ORF request) from each of the network device 101 and the network device 102, the network device 103 may alternatively send the first route to each of the network device 101 and the network device 102, where the ORF request is used to request the default route. In some embodiments, the ORF request includes a route type, and the route type indicates the default route. For example, before S201, the method may further include the following steps.

S206: The network device 101 sends a first ORF request to the network device 103.

The network device 101 sends the first ORF request to the network device 103 based on a hub-mode BGP-EVPN neighbor relationship with the network device 103.

S207: The network device 103 receives the first ORF request sent by the network device 101.

After receiving the first ORF request sent by the network device 101, the network device 103 sends the first route to the network device 101.

S208: The network device 102 sends a first ORF request to the network device 103.

The network device 102 sends the first ORF request to the network device 103 based on a hub-mode BGP-EVPN neighbor relationship with the network device 103.

S209: The network device 103 receives the first ORF request sent by the network device 102.

After receiving the first ORF request sent by the network device 102, the network device 103 sends the first route to the network device 102.

In some other embodiments, the network device 101 and the network device 102 may further send respective MAC routes to the network device 103. The method further includes the following steps.

S210: The network device 102 sends a second route to the network device 103.

The second route is used to instruct the network device 103 to forward, to the network device 102 based on the second route, a packet to be sent to the virtual machine connected to the network device 102.

S211: The network device 101 sends a third route to the network device 103.

The third route is used to instruct the network device 103 to forward, to the network device 101 based on the third route, a packet to be sent to the virtual machine connected to the network device 101.

S212: The network device 103 receives the second route sent by the network device 102.

S213: The network device 103 receives the third route sent by the network device 101.

Figure 3:
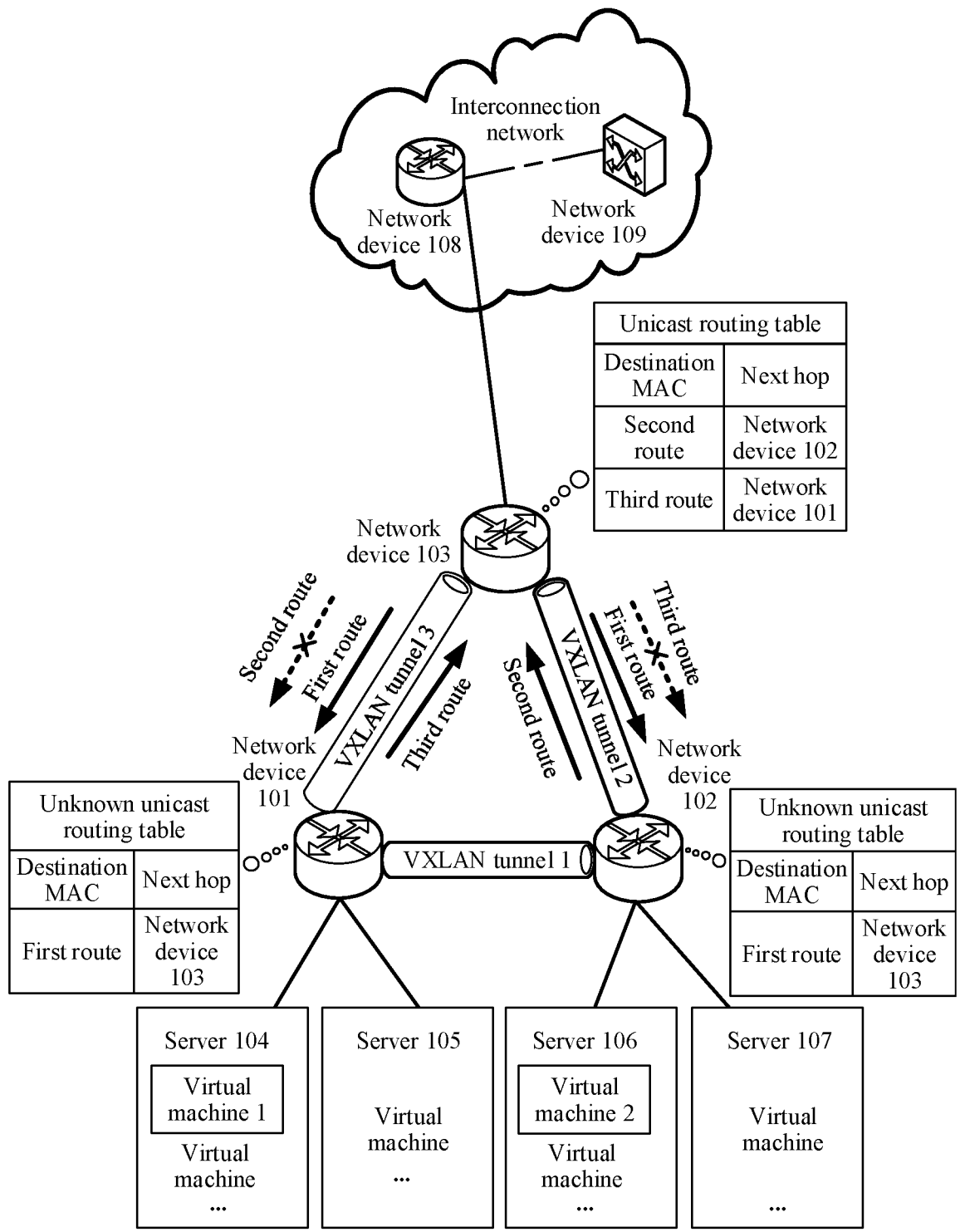
FIG. 3 is a schematic diagram of a route learning process according to an embodiment of this application.

For example, FIG. 3 is a schematic diagram of a route learning process according to an embodiment of this application. The network device 103 sends a first route to each of the network device 101 and the network device 102. The network device 102 sends the second route to the network device 103. The network device 101 sends a third route to the network device 103.

Based on a fact that the network device 101 is a first-mode neighbor of the network device 103, the network device 103 receives the second route sent by the network device 102, but does not forward the second route to the network device 101. Based on a fact that the network device 102 is a first-mode neighbor of the third network device 103, the network device 103 receives the third route sent by the network device 101, but does not forward the third route to the network device 102. In addition, the network device 101 and the network device 102 may further not advertise the second route or the third route to each other based on a fact that the network device 101 and the network device 102 are not first-mode neighbors of each other. For example, the network device 101 and the network device 102 may be second-mode neighbors of each other, for example, hub-mode neighbors.

In this way, both the network device 101 and the network device 102 store only the default route, but do not need to store a route of another network device in a VXLAN. This effectively reduces resource overheads and storage pressure of a customer edge node.

Further, after a virtual machine in a device (for example, a server 104 or a server 105) connected to the network device 101 is started, the virtual machine advertises a MAC address of the virtual machine to the network device 103. Similarly, after a virtual machine in a device (for example, a server 106 or a server 107) connected to the network device 102 is started, the virtual machine advertises a MAC address of the virtual machine to the network device 103. In this way, the network device 103 learns MAC addresses of all virtual machines connected to customer edge nodes in the VXLAN. When the virtual machines communicate with each other, the network device 103 forwards a unicast packet between the virtual machines.

Figure 4:
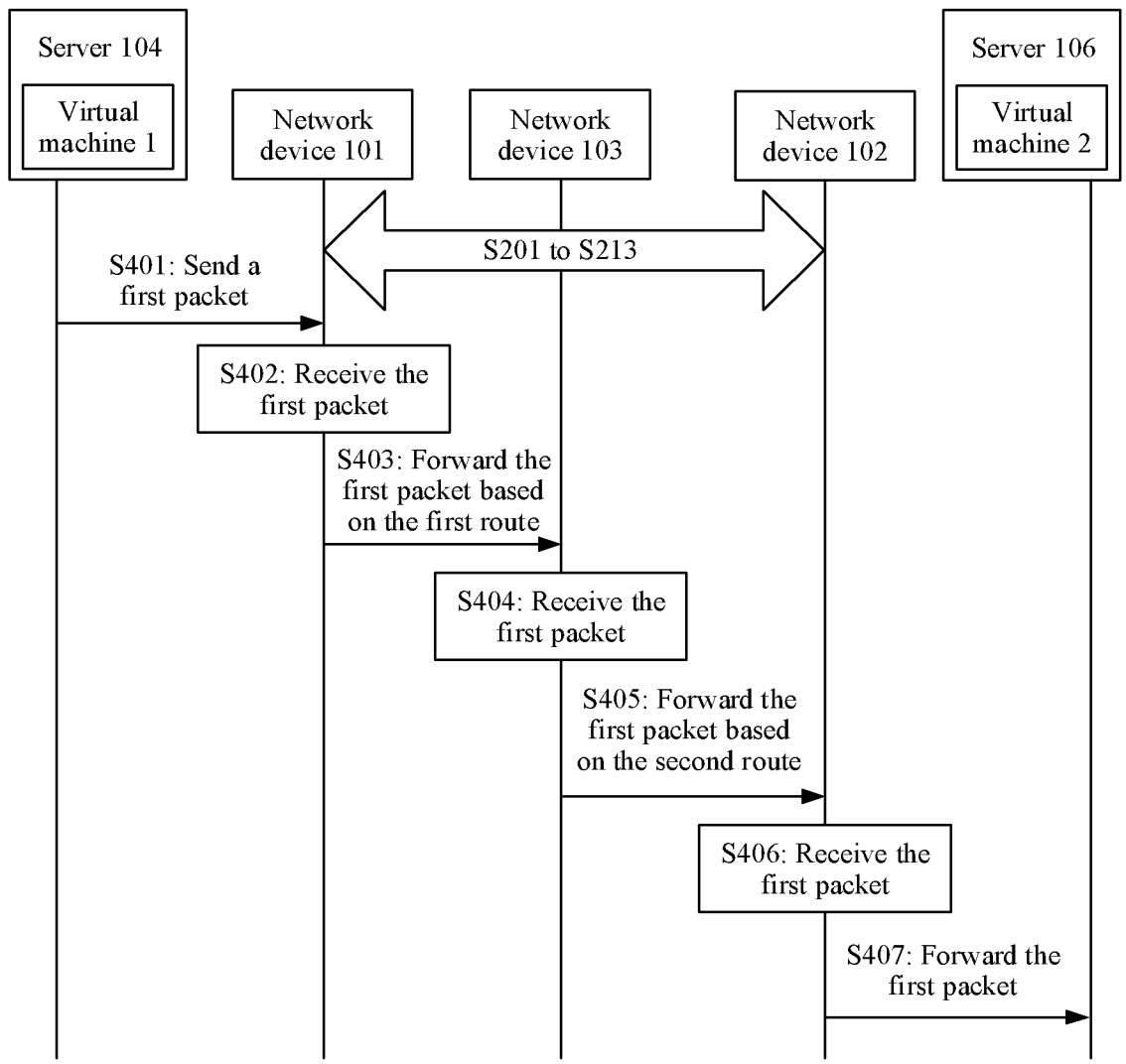
FIG. 4 is a flowchart of another data transmission method according to an embodiment of this application.

FIG. 4 is a flowchart of a data transmission method according to an embodiment of this application. A difference between FIG. 4 and FIG. 2 lies in that it is assumed herein that a network device 103 has learned an address of a network device 101, addresses of virtual machines in all servers connected to the network device 101, an address of a network device 102, and addresses of virtual machines in all servers connected to the network device 102. The network device 103 establishes a first-mode neighbor with each of the network device 101 and the network device 102. An example in which a virtual machine 1 in a server 104 accesses a virtual machine 2 in a server 106 is used for description. It is assumed that the virtual machine 1 in the server 104 has learned a MAC address of the virtual machine 2 in the server 106. As shown in FIG. 4, after S201 to S213, the method includes the following steps.

S401: The virtual machine 1 in the server 104 sends a first packet to the network device 101.

A header of the first packet includes a MAC address of the virtual machine 1 and the MAC address of the virtual machine 2. The first packet is a packet sent by the virtual machine 1 connected to the network device 101 to the virtual machine 2 connected to the network device 102. In this embodiment, the first packet is a unicast packet.

S402: The network device 101 receives the first packet sent by the virtual machine 1 in the server 104.

S403: The network device 101 forwards the first packet based on a first route.

Because the network device 101 does not find the MAC address of the virtual machine 2 in a unicast routing table, the network device 101 forwards the first packet to the network device 103 by using the first route in an unknown unicast routing table.

It may be understood that the network device 101 may encapsulate the first packet by using UDP, to obtain a first VXLAN packet. A header of the first VXLAN packet may include an IP address of the network device 101, an IP address of the network device 103, a MAC address of the network device 101, and the MAC address that is of the virtual machine 2 connected to the network device 102 and that is included in the first packet. The network device 101 sends the first VXLAN packet to the network device 103 through a VXLAN tunnel 3 between the network device 101 and the network device 103.

S404: The network device 103 receives the first packet sent by the network device 101.

S405: The network device 103 forwards the first packet to the network device 102 based on a second route.

The network device 103 decapsulates the first VXLAN packet, and queries the unicast routing table based on the MAC address of the virtual machine 2 connected to the network device 102, to obtain the second route. If the network device 102 is a spoke neighbor of the network device 103, the network device 103 forwards the first packet to the network device 102 based on the second route.

It may be understood that the network device 103 may encapsulate the first packet by using UDP, to obtain a second VXLAN packet. The network device 103 forwards the second VXLAN packet to the network device 102 based on the second route through a VXLAN tunnel 2 between the network device 103 and the network device 102. A header of the second VXLAN packet includes the IP address of the network device 103, a MAC address of the network device 103, an IP address of the network device 102, and a MAC address of the network device 102. S406: The network device 102 receives the first packet sent by the network device 103.

S407: The network device 102 forwards the first packet to the virtual machine 2 connected to the network device 102.

It may be understood that the network device 102 decapsulates the second VXLAN packet to obtain the first packet, and sends the first packet to the virtual machine 2 connected to the network device 102.

Figure 5:
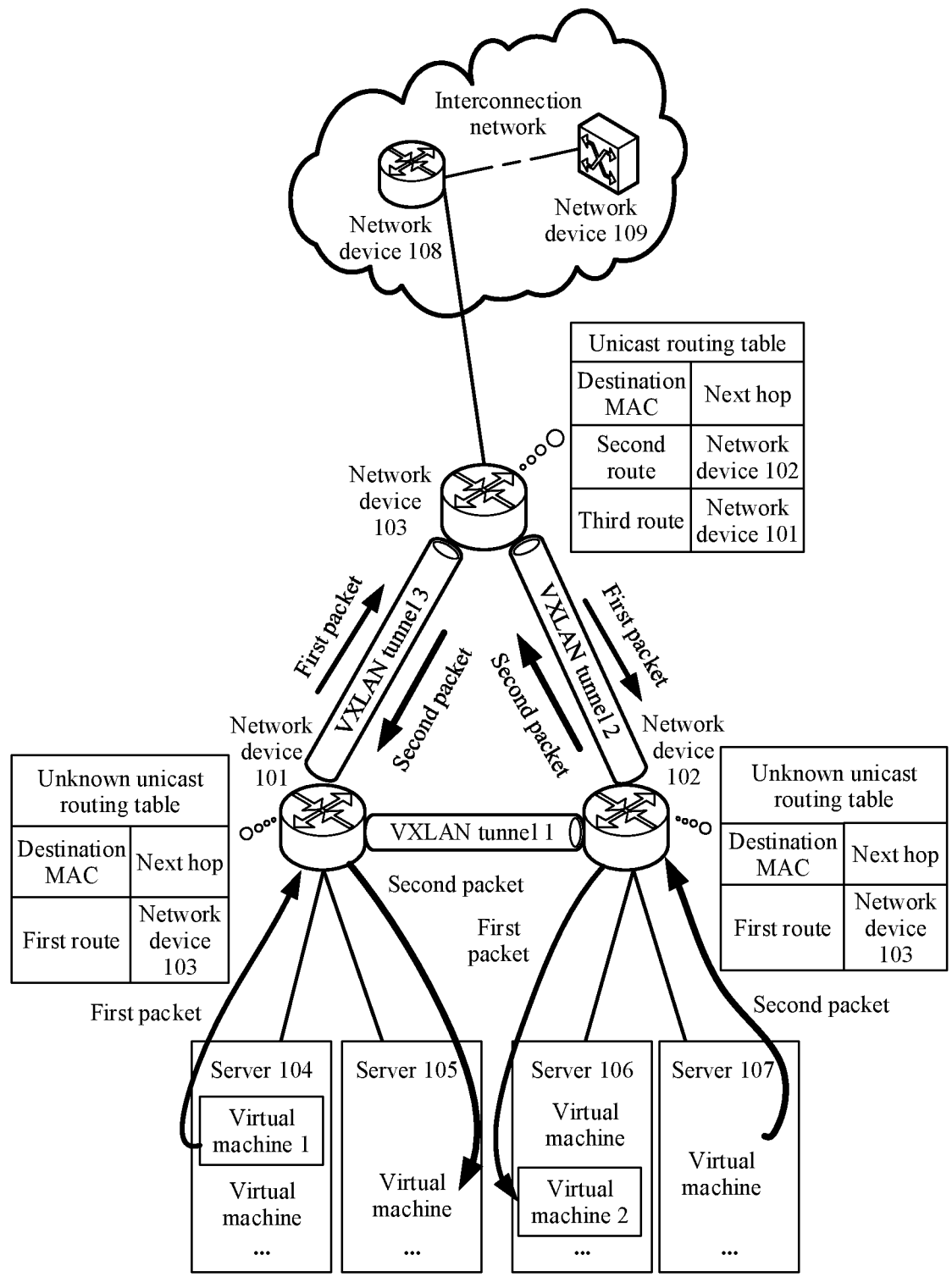
FIG. 5 is a schematic diagram of a packet sending process according to an embodiment of this application.

For example, FIG. 5 is a schematic diagram of a packet sending process according to an embodiment of this application. A path through which the virtual machine 1 in the server 104 sends the first packet to the virtual machine 2 in the server 106 is: the virtual machine 1 in the server 104→the network device 101→the network device 103→the network device 102→the virtual machine 2 in the server 106. A path through which a virtual machine in a server 107 sends a second packet to a virtual machine in a server 105 is: the virtual machine in the server 107→the network device 102→the network device 103→the network device 101→the virtual machine in the server 105.

In this way, when both the network device 101 and the network device 102 store only a default route, and do not need to store a route of another network device in a VXLAN, a route for sending a packet to the virtual machine 2 connected to the network device 102 is obtained from the network device 103 based on a requirement, and the packet is forwarded by using the network device 103, so that the virtual machine 1 connected to the network device 101 communicates with the virtual machine 2 connected to the network device 102. This effectively reduces resource overheads and storage pressure of the customer edge node.

Figure 6A:
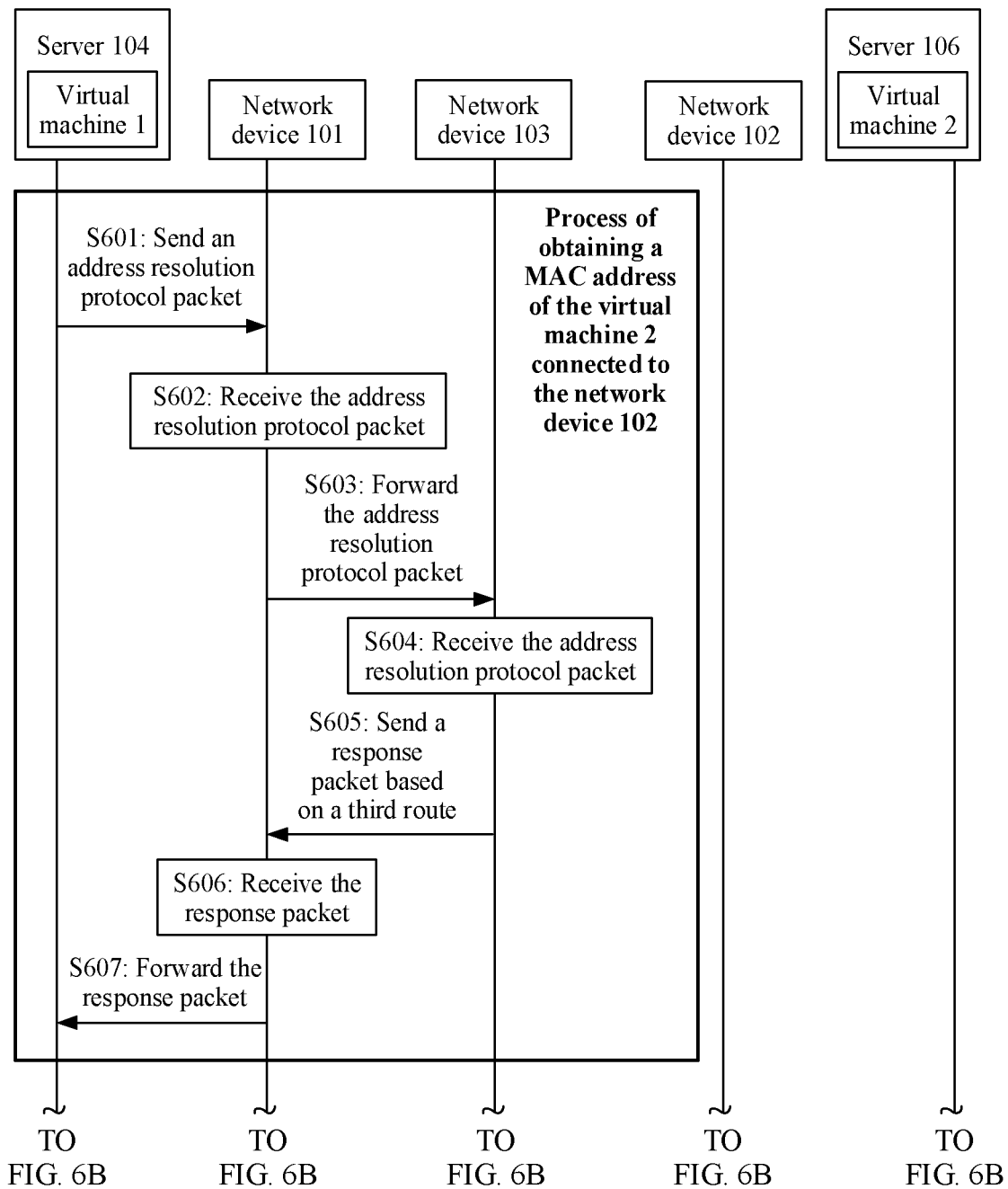
FIG. 6A and FIG. 6B are a flowchart of another data transmission method according to an embodiment of this application.
Figure 6B:
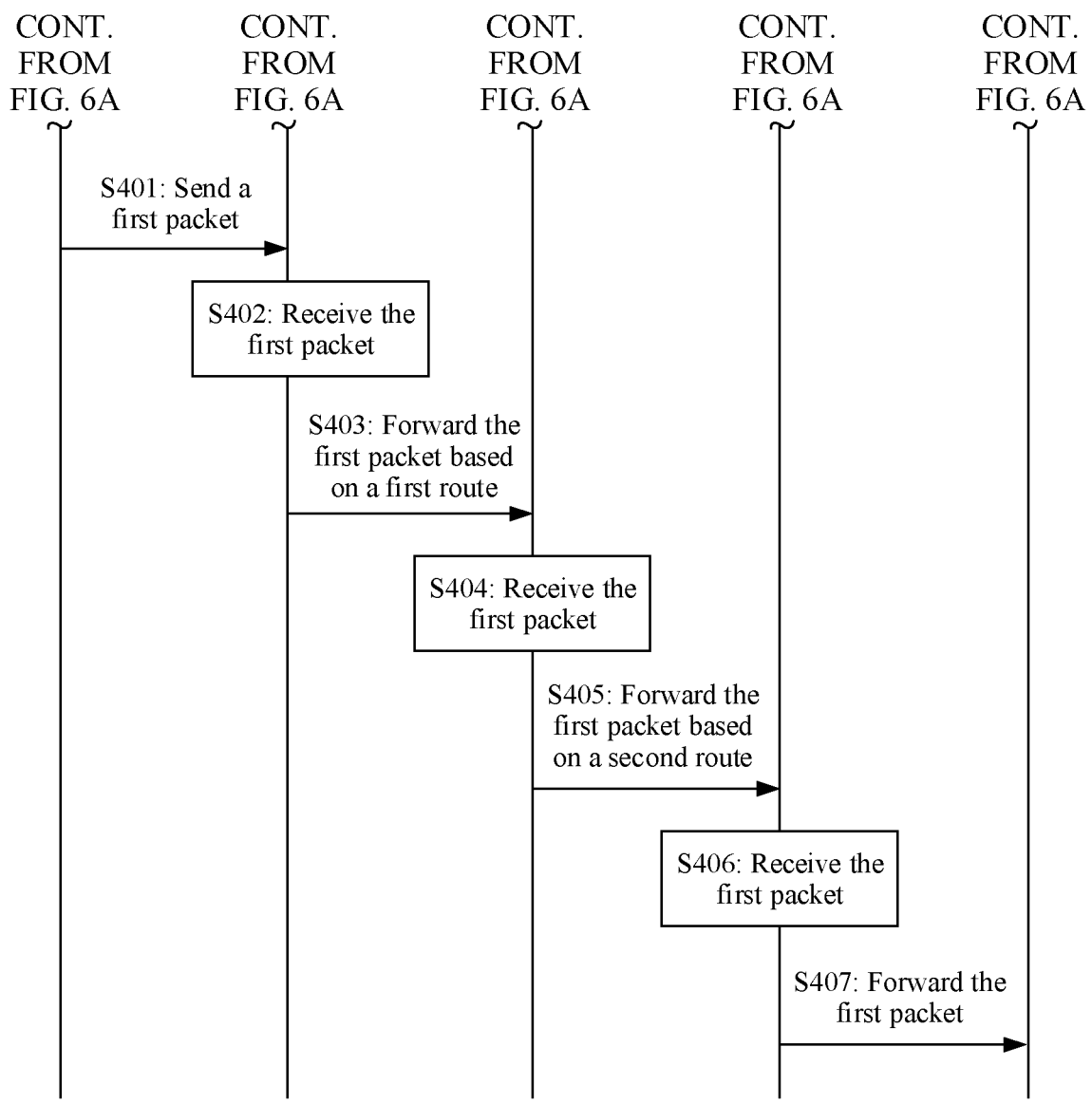

In some embodiments, if a virtual machine 1 connected to a network device 101 does not know a MAC address of a virtual machine 2 connected to a network device 102, the virtual machine 1 connected to the network device 101 sends a request to obtain the MAC address of the virtual machine 2 connected to the network device 102. FIG. 6A and FIG. 6B are a flowchart of a data transmission method according to an embodiment of this application. As shown in FIG. 6A and FIG. 6B, before S401, the method further includes the following steps.

S601: The virtual machine 1 in a server 104 sends an ARP packet to the network device 101.

The ARP packet is used to request a MAC address of the virtual machine 2 connected to the network device 102. The ARP packet includes an IP address of the virtual machine 2 connected to the network device 102.

S602: The network device 101 receives the ARP packet sent by the virtual machine 1 in the server 104.

S603: The network device 101 forwards the ARP packet to a network device 103.

After the network device 101 receives the ARP packet, if the network device 101 finds, in a locally stored ARP table, the MAC address that is of the virtual machine 2 and that is associated with the IP address of the virtual machine 2, the network device 101 feeds back the MAC address of the virtual machine 2 to the virtual machine 1 in the server 104. Otherwise, if the network device 101 does not find, in a locally stored ARP table, the MAC address that is of the virtual machine 2 and that is associated with the IP address of the virtual machine 2, the network device 101 broadcasts the ARP packet to the network device 103. For example, the network device 101 broadcasts the ARP packet to the network device 103 based on an IMET route sent by the network device 103.

It may be understood that the network device 101 may encapsulate the ARP packet by using UDP, to obtain a third VXLAN packet. The network device 101 sends the third VXLAN packet to the network device 103 through a VXLAN tunnel 3 between the network device 101 and the network device 103.

S604: The network device 103 receives the ARP packet sent by the network device 101.

S605: The network device 103 sends a response packet to the network device 101 based on a third route.

Because the network device 103 learns the IP address and the MAC address of the virtual machine 2 connected to the network device 102, the network device 103 queries the ARP table based on the IP address of the virtual machine 2 connected to the network device 102 to obtain the MAC address of the virtual machine 2 connected to the network device 102. The network device 103 generates the response packet, where the response packet includes the MAC address of the virtual machine 2 connected to the network device 102. The network device 103 forwards the response packet to the network device 101 through the VXLAN tunnel 3 between the network device 101 and the network device 103. It may be understood that the network device 103 may encapsulate the response packet by using UDP, to obtain a fourth VXLAN packet. The network device 103 sends the fourth VXLAN packet to the network device 101 through the VXLAN tunnel 3 between the network device 103 and the network device 101.

For example, it is assumed that the IP address of the virtual machine 2 connected to the network device 102 is 10.1.1.2, and the MAC address of the virtual machine 2 connected to the network device 102 is 2-2-2. The network device 103 finds 2-2-2 based on 10.1.1.2, and feeds back 10.1.1.2 and 2-2-2 to the network device 101.

S606: The network device 101 receives the response packet sent by the network device 103.

S607: The network device 101 sends the response packet to the virtual machine 1 connected to the network device 101.

Further, the virtual machine 1 connected to the network device 101 may send, based on the MAC address of the virtual machine 2 connected to the network device 102, a packet to the virtual machine 2 connected to the network device 102. For details, refer to the descriptions of S401 to S407 in the foregoing embodiments. The details are not described herein again.

Figure 7:
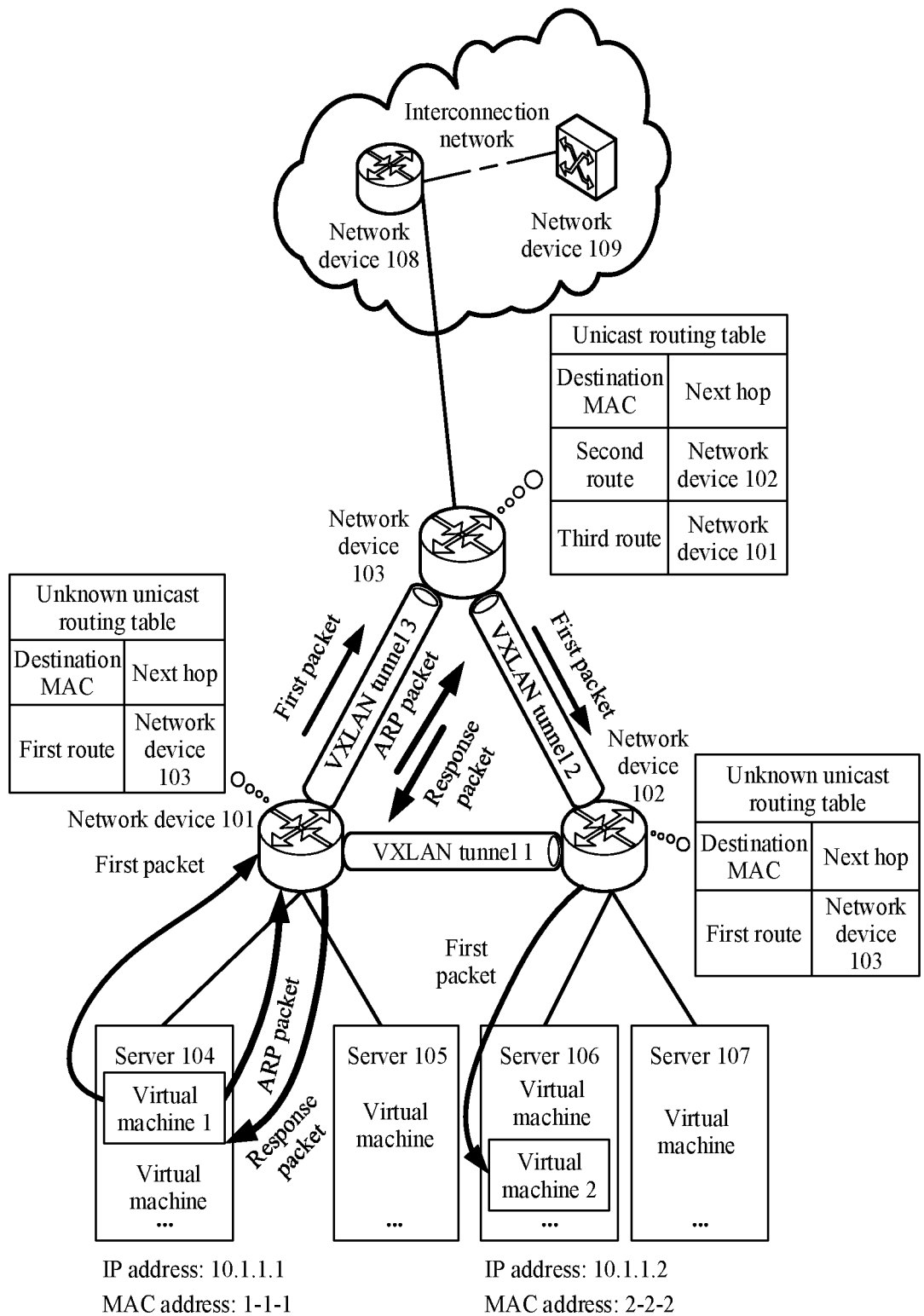
FIG. 7 is a schematic diagram of an Address Resolution Protocol (ARP) packet sending process according to an embodiment of this application.

For example, FIG. 7 is a schematic diagram of an ARP packet sending process according to an embodiment of this application. A path through which the virtual machine 1 in the server 104 to request the MAC address of the virtual machine 2 in the server 106 by using the ARP packet is: the virtual machine 1 in the server 104→the network device 101→the network device 103→the network device 101→the virtual machine 1 in the server 104.

Optionally, the network device 101 may generate an ORF request based on an ARP request sent by the virtual machine 1 connected to the network device 101, and the network device 101 obtains, by using the ORF request, the MAC address of the virtual machine 2 connected to the network device 102. For example, the network device 101 sends a second ORF request to the network device 103, where a route type included in the second ORF request indicates to obtain a route of the virtual machine 2 connected to the network device 102.

The network device 101 dynamically requests a MAC address based on unicast traffic of a service to accurately request the route, and sends a packet based on the requested route to implement an optimal path. In this way, a quantity of MAC addresses stored in the network device 101 is reduced, and resource overheads and storage pressure of the network device 101 are reduced.

A destination address of the route of the virtual machine 2 connected to the network device 102 is an address of the virtual machine 2 connected to the network device 102. In addition, the network device 103 may store a next hop of the route of the virtual machine 2 connected to the network device 102 as the network device 102.

Figure 8:
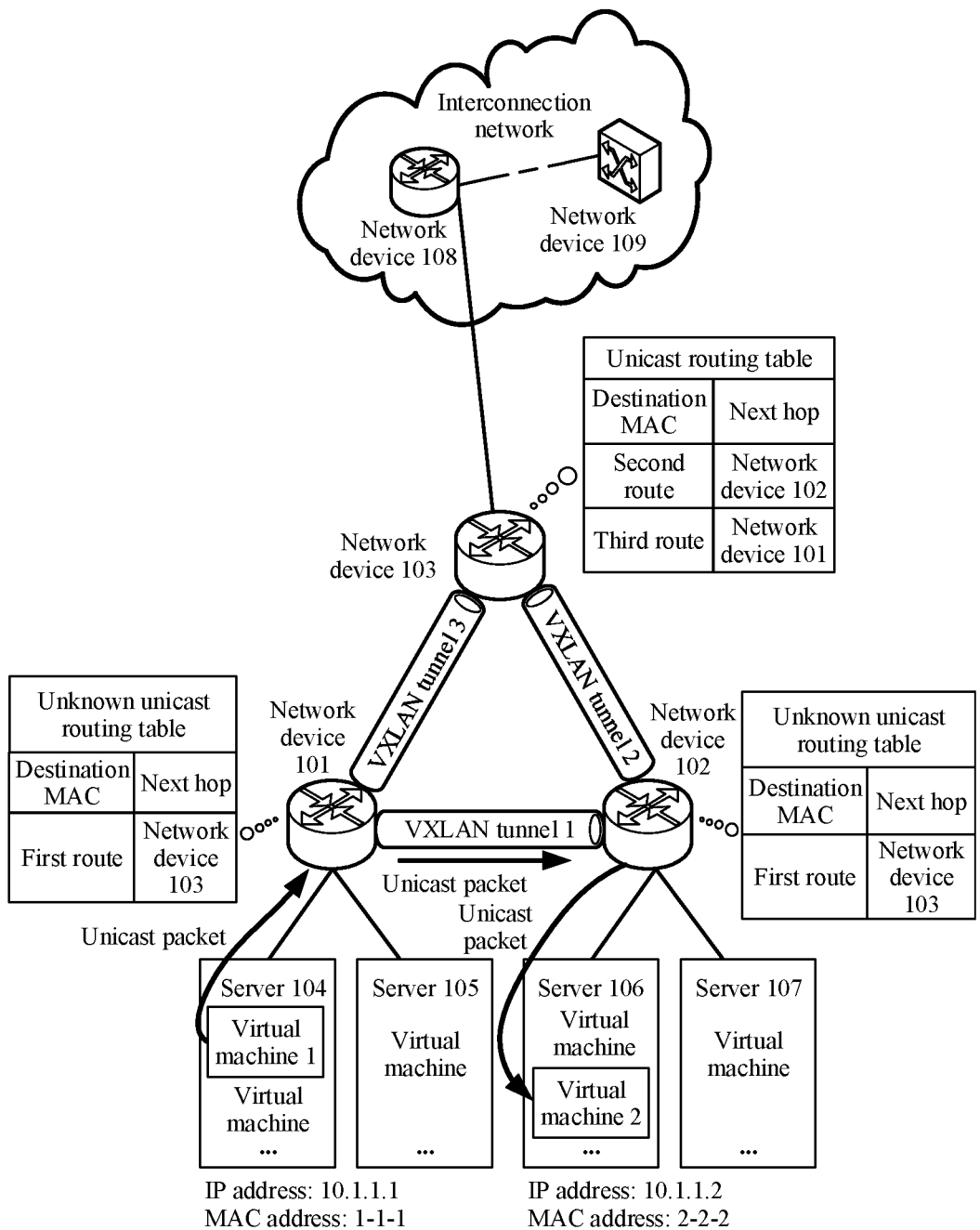
FIG. 8 is a schematic diagram of another packet sending process according to an embodiment of this application.

A large quantity of resources of the network device 103 are consumed if a packet sent by the virtual machine connected to the network device 101 to the virtual machine connected to the network device 102 is forwarded by the network device 103 each time. In another case, if a quantity of times that the virtual machine in the server 104 sends a packet to the virtual machine connected to the network device 102 is greater than a preset threshold, the network device 101 may generate an ORF request, and the network device 101 obtains, by using the ORF request, a MAC address of the virtual machine connected to the network device 102. After receiving the MAC address that is of the virtual machine connected to the network device 102 and that is sent by the network device 103, the network device 101 adds the MAC address of the virtual machine connected to the network device 102 to a unicast routing table. In this way, the network device 103 is prevented from forwarding a packet sent by the virtual machine connected to the network device 101 to the virtual machine connected to the network device 102, and resource consumption of the network device 103 is reduced. Subsequently, when the virtual machine connected to the network device 101 sends a packet to the virtual machine connected to the network device 102, the network device 101 may query the unicast routing table, to obtain the MAC address of the virtual machine connected to the network device 102. The network device 101 forwards the packet from the virtual machine connected to the network device 101 to the network device 102 through a VXLAN tunnel 1 between the network device 101 and the network device 102, but no longer needs to forward the packet from the virtual machine connected to the network device 101 to the network device 103. The network device 103 queries the MAC address of the virtual machine connected to the network device 102, and forwards the packet from the virtual machine connected to the network device 101. For example, FIG. 8 is a schematic diagram of a packet sending process according to an embodiment of this application. A path through which the virtual machine 1 in the server 104 sends a unicast packet to the virtual machine 2 in the server 106 is: the virtual machine 1 in the server 104→the network device 101→the network device 102→the virtual machine 2 in the server 106.

In addition, if the network device 101 does not receive, within preset duration, the unicast packet sent by the virtual machine connected to the network device 101 to the virtual machine connected to the network device 102, the network device 101 may delete, from the unicast routing table, the MAC address of the virtual machine connected to the network device 102. Therefore, a quantity of MAC addresses stored in the network device 101 is reduced.

In another possible implementation, the network device 101 may further negotiate a quantity of ORF requests with the network device 103, where the ORF request is used to request a route of a user-side device connected to a network device. The network device 103 may determine the quantity of ORF requests based on a quantity of spoke neighbors of the network device 103 or a route distinguisher (RD) value of an EVPN instance. Alternatively, the network device 101 notifies the network device 103 of a maximum quantity of ORF requests. After the network device 103 receives ORF requests whose quantity is greater than a threshold, the network device 103 discards a redundant quantity of ORF requests.

Figure 9:
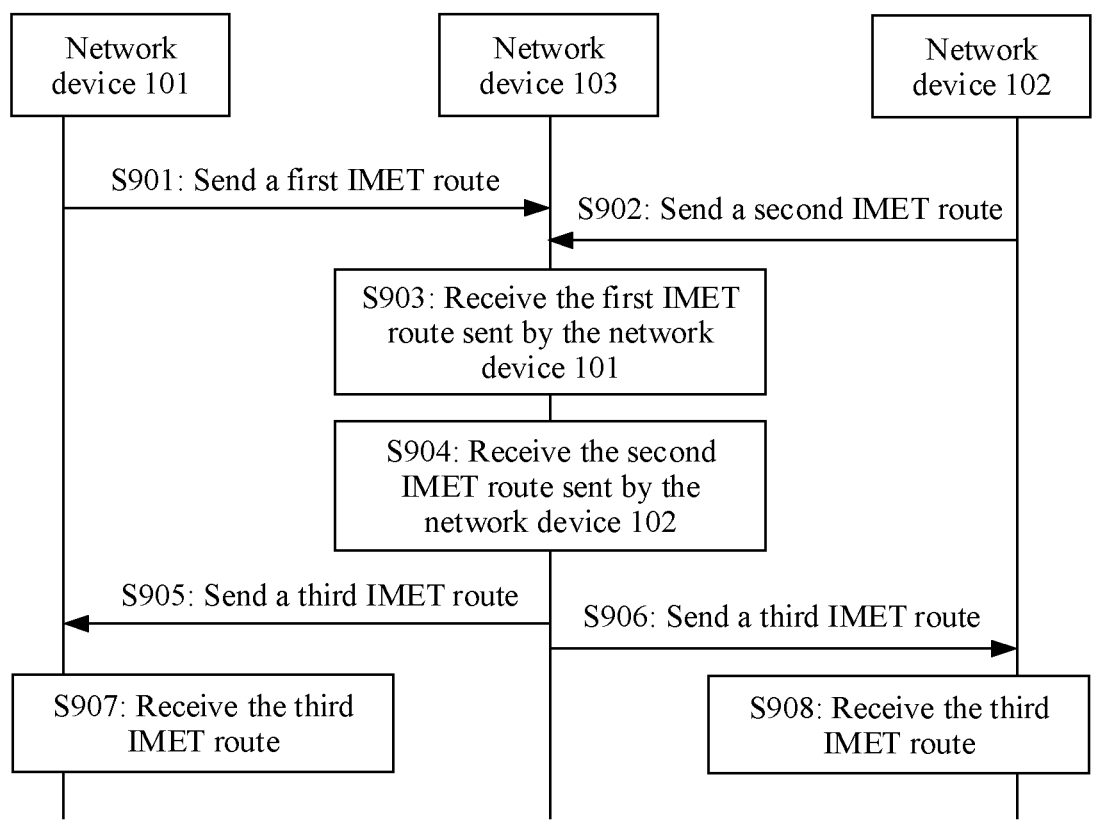
FIG. 9 is a flowchart of another data transmission method according to an embodiment of this application.

FIG. 9 is a flowchart of a data transmission method according to an embodiment of this application. Herein, a network device 101, a network device 102, and a network device 103 are used as examples for description. The network device 103 establishes a first-mode neighbor with each of the network device 101 and the network device 102, where the first-mode neighbor may be a spoke neighbor. As shown in FIG. 9, the method includes the following steps.

S901: The network device 101 sends a first IMET route to the network device 103.

The network device 101 determines, based on stored information about a network device that establishes the spoke neighbor with the network device 101, that the network device 101 is the first-mode neighbor of the network device 103, and the network device 101 sends the first IMET route to the network device 103.

The first IMET route is used to instruct the network device 103 to forward, to the network device 101 based on the first IMET route, a BUM packet to be sent to a virtual machine connected to the network device 101. To be specific, the packet to be sent to the virtual machine connected to the network device 101 is any one of a broadcast packet, an unknown unicast packet, or a multicast packet.

The network device 101 sends the first IMET route to the network device 103 based on a hub-mode BGP-EVPN neighbor relationship with the network device 103.

S902: The network device 102 sends a second IMET route to the network device 103.

The network device 102 determines, based on stored information about a network device that establishes the spoke neighbor with the network device 102, that the network device 102 is the first-mode neighbor of the network device 103, and the network device 102 sends the second IMET route to the network device 103.

The second IMET route is used to instruct the network device 103 to forward, to the network device 102 based on the second IMET route, a BUM packet to be sent to a virtual machine connected to the network device 102.

The network device 102 sends the second IMET route to the network device 103 based on a hub-mode BGP-EVPN neighbor relationship with the network device 103.

S903: The network device 103 receives the first IMET route sent by the network device 101.

After receiving the first IMET route, the network device 103 records the first IMET route in a broadcast routing table. After receiving the BUM packet sent by the virtual machine connected to the network device 102, the network device 103 may forward the BUM packet to the network device 101 based on the first IMET route.

S904: The network device 103 receives the second IMET route sent by the network device 102.

After receiving the second IMET route, the network device 103 records the second IMET route in the broadcast routing table. After receiving the BUM packet sent by the virtual machine connected to the network device 101, the network device 103 may forward the BUM packet to the network device 102 based on the second IMET route.

S905: The network device 103 sends a third IMET route to the network device 101.

The network device 103 sends the third IMET route to the network device 101 based on a spoke neighbor relationship with the network device 101, to instruct the network device 101 to send a packet to the network device 103 based on the third IMET route.

S906: The network device 103 sends a third IMET route to the network device 102.

The network device 103 sends the third IMET route to the network device 102 based on a spoke neighbor relationship with the network device 102, to instruct the network device 102 to send a packet to the network device 103 based on the third IMET route.

S907: The network device 101 receives the third IMET route sent by the network device 103.

S908: The network device 102 receives the third IMET route sent by the network device 103.

Optionally, the network device 103 may alternatively send the third IMET route to each of the network device 101 and the network device 102, and then receive the first IMET route sent by the network device 101 and the second IMET route sent by the network device 102. A sequence of S901 to S904 and a sequence of S905 to S908 are not limited in this embodiment.

Figure 10:
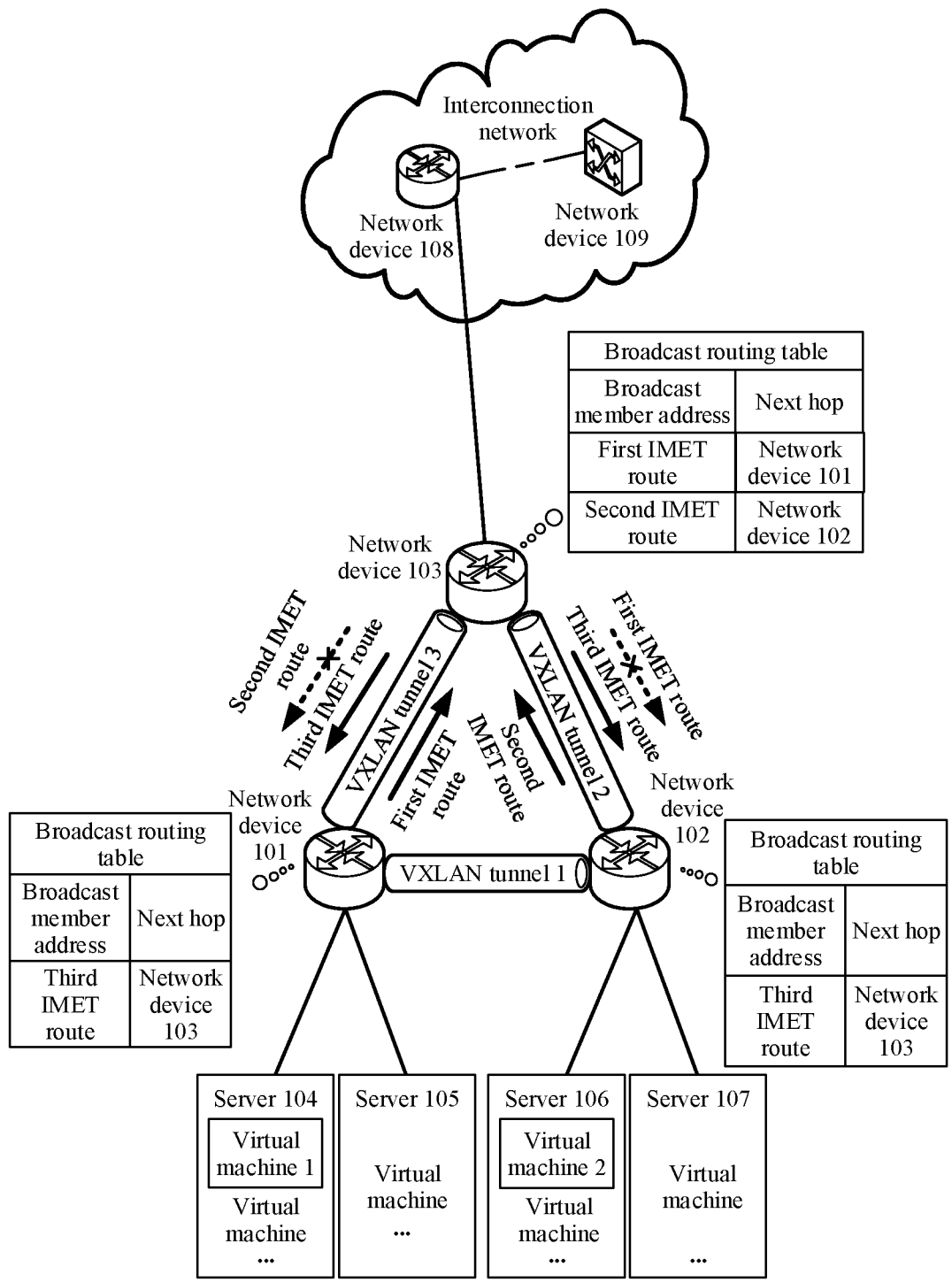
FIG. 10 is a schematic diagram of another route learning process according to an embodiment of this application.

For example, FIG. 10 is a schematic diagram of a route learning process according to an embodiment of this application. The network device 103 sends a third IMET route to each of the network device 101 and the network device 102. The network device 102 sends a second IMET route to the network device 103. The network device 101 sends a first IMET route to the network device 103.

It should be noted that based on a fact that the network device 101 is the first-mode neighbor of the network device 103, the network device 103 receives the second IMET route sent by the network device 102, but does not forward the second IMET route to the network device 101, and based on a fact that the network device 102 is the first-mode neighbor of the third network device 103, the network device 103 receives the first IMET route sent by the network device 101, but does not forward the first IMET route to the network device 102. In addition, the network device 101 and the network device 102 may further not advertise the first IMET route or the second IMET route to each other based on a fact that the network device 101 and the network device 102 are not first-mode neighbors of each other. For example, the network device 101 and the network device 102 may be second-mode neighbors of each other, for example, hub-mode neighbors.

In this way, both the network device 101 and the network device 102 store only the IMET route of the network device 103, but do not need to store an IMET route of another network device in a VXLAN. This effectively reduces resource overheads and storage pressure of a customer edge node.

Figure 11:
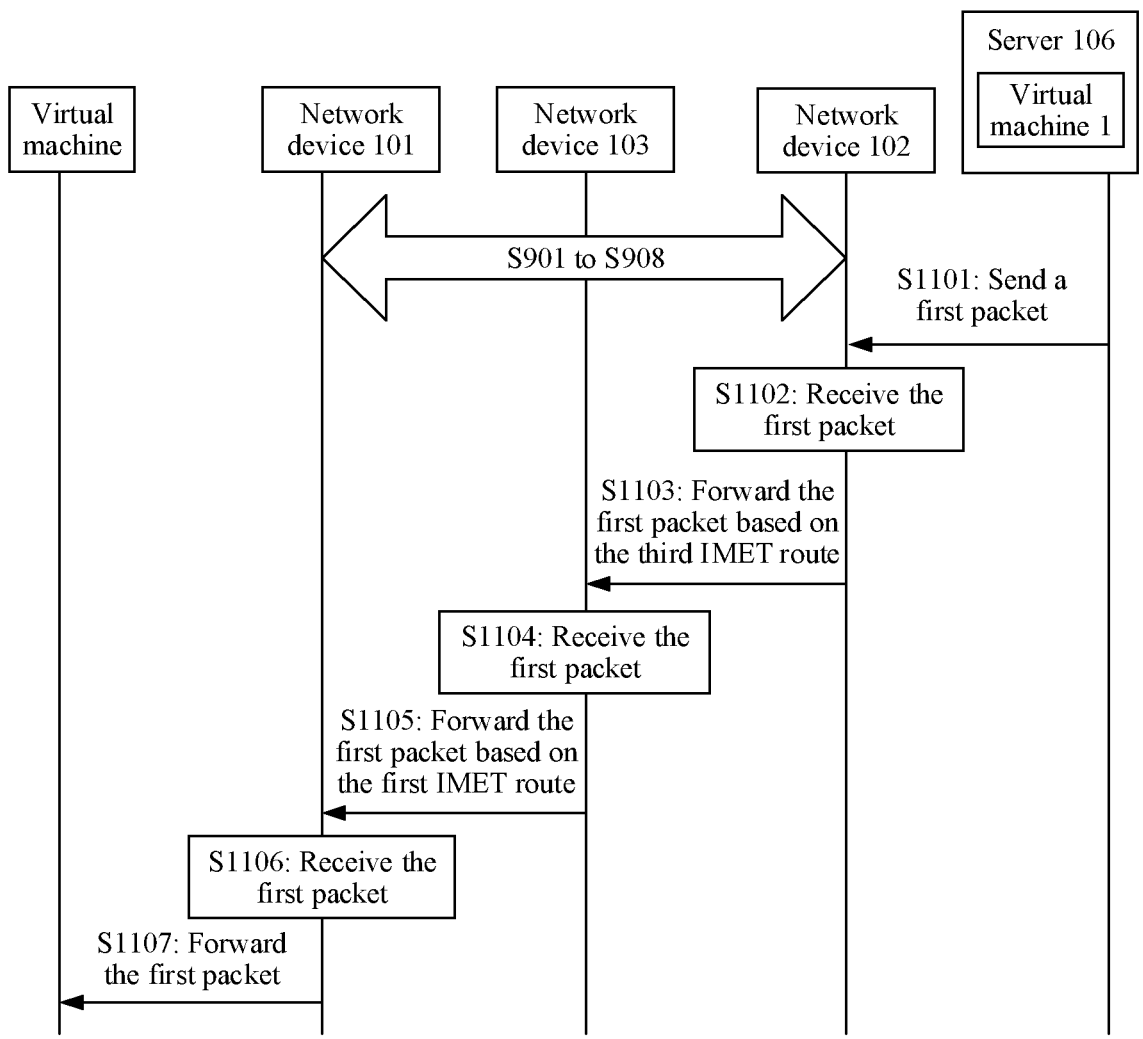
FIG. 11 is a flowchart of another data transmission method according to an embodiment of this application.

FIG. 11 is a flowchart of a data transmission method according to an embodiment of this application. Herein, an example in which the virtual machine 2 in the server 106 sends a BUM packet is used for description. As shown in FIG. 11, after S901 to S908, the method includes the following steps.

S1101: The virtual machine 2 in the server 106 sends a first packet to the network device 102.

A header of the first packet includes a MAC address of the virtual machine 2 in the server 106 and a broadcast address. In this embodiment, the first packet is a BUM packet.

S1102: The network device 102 receives the first packet sent by the virtual machine 2 in the server 106.

S1103: The network device 102 forwards the first packet based on a third IMET route.

The network device 102 searches a broadcast routing table, and forwards the first packet to the network device 103 by using the third IMET route in the broadcast routing table.

It may be understood that the network device 102 may encapsulate the first packet by using UDP, to obtain a first VXLAN packet. A header of the first VXLAN packet may include an IP address of the network device 102 and an IP address of the network device 103. The network device 102 sends the first VXLAN packet to the network device 103 through a VXLAN tunnel 2 between the network device 102 and the network device 103.

S1104: The network device 103 receives the first packet sent by the network device 102.

S1105: The network device 103 forwards the first packet to the network device 101 based on a first IMET route.

The network device 103 decapsulates the first VXLAN packet, determines that the first packet is the BUM packet, and encapsulates the first packet by using UDP, to obtain a second VXLAN packet. The network device 103 forwards the second VXLAN packet to the network device 101 based on the first IMET route through a VXLAN tunnel 3 between the network device 103 and the network device 101. A header of the second VXLAN packet may include an IP address of the network device 103, a MAC address of the network device 103, an IP address of the network device 101, and a MAC address of the network device 101.

S1106: The network device 101 receives the first packet sent by the network device 103.

S1107: The network device 101 forwards the first packet to the virtual machine connected to the network device 101.

It may be understood that the network device 101 decapsulates the second VXLAN packet to obtain the first packet, and sends the first packet to each of the virtual machine in the server 104 connected to the network device 101 and the virtual machine in the server 105 connected to the network device 101.

Figure 12:
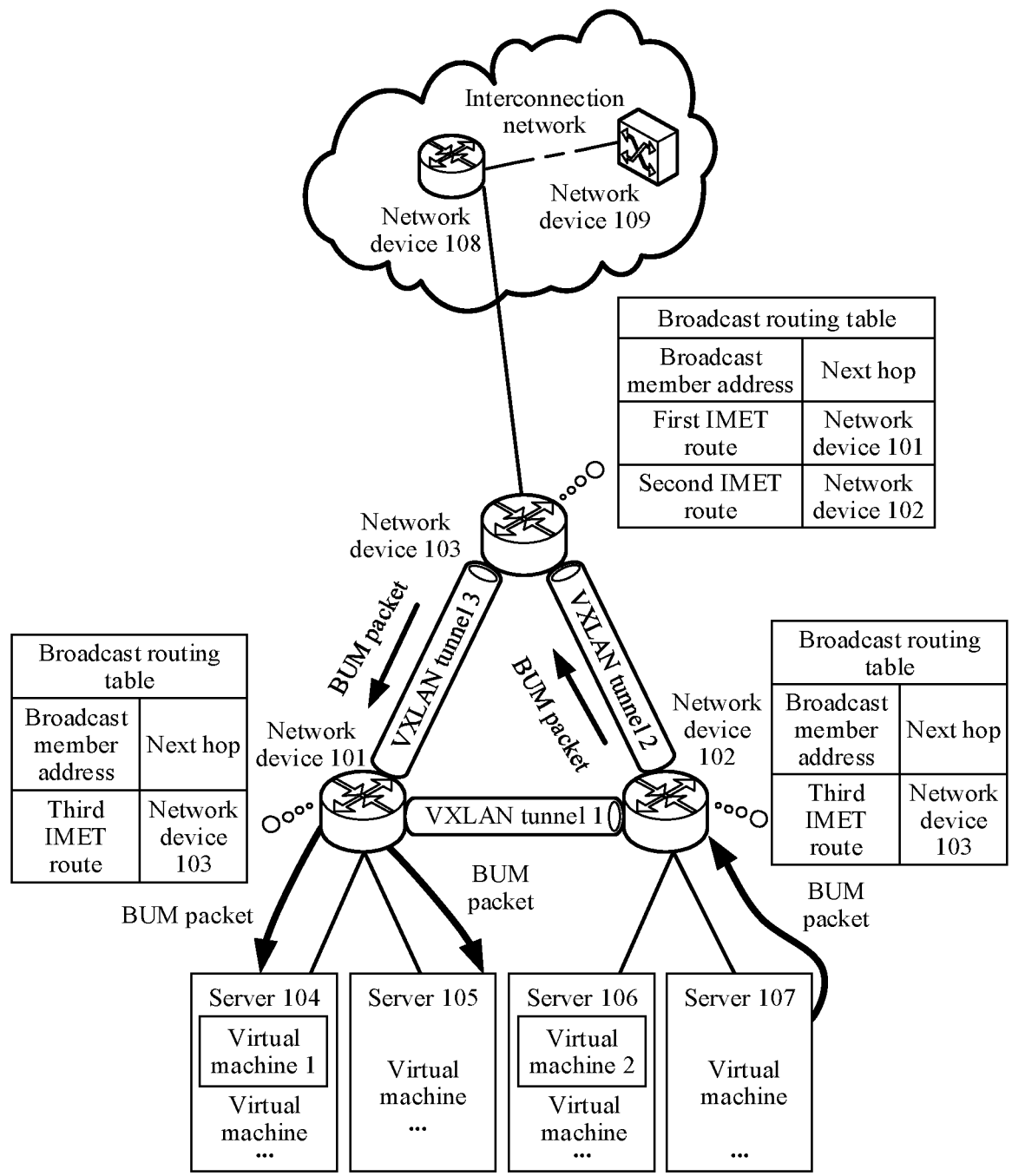
FIG. 12 is a schematic diagram of another packet sending process according to an embodiment of this application.

For example, FIG. 12 is a schematic diagram of a packet sending process according to an embodiment of this application. A path through which a virtual machine in a server 107 sends a BUM packet is: the virtual machine in the server 107→the network device 102→the network device 103→the network device 101→the virtual machines in the server 104 and the server 105.

In this way, when both the network device 101 and the network device 102 store only the IMET route of the network device 103, but do not need to store an IMET route of another network device in a VXLAN, the network device 103 forwards the BUM packet, so that the virtual machine connected to the network device 101 communicates with the virtual machine connected to the network device 102. This effectively reduces resource overheads and storage pressure of the customer edge node.

Optionally, when receiving the BUM packet sent by the virtual machine connected to the network device 102, the network device 103 may perform a source pruning operation, that is, the network device 103 forwards the BUM packet to the network device 101, but no longer forwards the BUM packet to the network device 102. Further, in a VXLAN manner or an SRv6 manner, a source IP field in the BUM packet may be used for filtering. In a Multiprotocol Label Switching (MPLS) manner, a source label needs to be added to the BUM packet for filtering.

In the embodiments described in this application, a VXLAN tunnel is used as an example. In another possible application scenario applicable to the embodiments of this application, a type of the tunnel may alternatively be an SRv6 tunnel or an MPLS tunnel.

In some other embodiments, the network device 103 may establish a second-mode neighbor with another network device (for example, a network device 108), where the second-mode neighbor may be a hub-mode neighbor.

The network device 103 receives a unicast packet from the network device 108, and queries a unicast routing table. If a next hop is a spoke neighbor (for example, the network device 101 or the network device 102) of the network device 103, the network device 103 sends the unicast packet to the spoke neighbor.

The network device 103 receives, from the network device 108, a route or an IMET route that is of a virtual machine mounted on the network device 108 and that is advertised by the network device 108 to the network device 103, but does not send the route or the IMET route to a spoke neighbor (for example, the network device 101 or the network device 102) of the network device 103.

The network device 103 receives a unicast packet from a spoke neighbor (for example, the network device 101 or the network device 102), and queries a unicast routing table. If a next hop is a BGP-EVPN neighbor (for example, the network device 108) of the network device 103, the network device 103 sends the unicast packet to the BGP-EVPN neighbor.

The network device 103 receives a BUM packet from the network device 108, and queries a broadcast routing table. If a next hop is a spoke neighbor (for example, the network device 101 or the network device 102) of the network device 103, the network device 103 sends the BUM packet to the spoke neighbor.

The network device 103 receives a BUM packet from a spoke neighbor (for example, the network device 101 or the network device 102), and queries a broadcast routing table. If a next hop is a BGP-EVPN neighbor (for example, the network device 108) of the network device 103, the network device 103 sends the BUM packet to the BGP-EVPN neighbor.

In some other embodiments, when a network scale is relatively large, a network topology may be a layer 3 network topology. The layer 3 network topology may include a core layer (or a spine layer), an aggregation layer, and an access layer (or a leaf layer). The network in this application may also be referred to as a data transmission network. The data transmission network may be, for example, a network in which a data center is used as an example, or a network deployed in a campus.

The core layer may be, for example, a high-speed switching backbone layer of the network, and is configured to connect the network to a device (for example, an external operator device) outside the network. The core layer may include a switch and a router that have high bandwidth (for example, bandwidth higher than 1000 megabits per second (Mbps)). The core layer is featured in at least one of reliability, high efficiency, redundancy, fault tolerance, manageability, adaptability, low latency, and the like. A routing connection at the core layer plays a key role in the network. Usually, network reliability can be implemented through a redundancy connection between a plurality of devices. In this embodiment, the switch and the router that are included in the aggregation layer have functions of the network device 103 in the foregoing embodiments.

The aggregation layer may be, for example, an "intermediate" between the access layer and the core layer, and is configured to aggregate data before data sent by a workstation (for example, a terminal device or a server) enters the core layer, to reduce load of the core layer. The aggregation layer may include a switch and a router that support a layer 3 switching technology and a VXLAN. In this embodiment, the switch and the router that are included in the aggregation layer have functions of the network device 103 in the foregoing embodiments.

The access layer may be, for example, connected to a workstation, and is configured to provide workstation access for a local network segment. The access layer may include a switch and a router that do not support a VLAN and a layer 3 switching technology, or may include a switch and a router that support a VLAN and a layer 3 switching technology. In this embodiment, the switch and the router that are included in the access layer have functions of the network device 101 and functions of the network device 102 in the foregoing embodiments.

Figure 13:
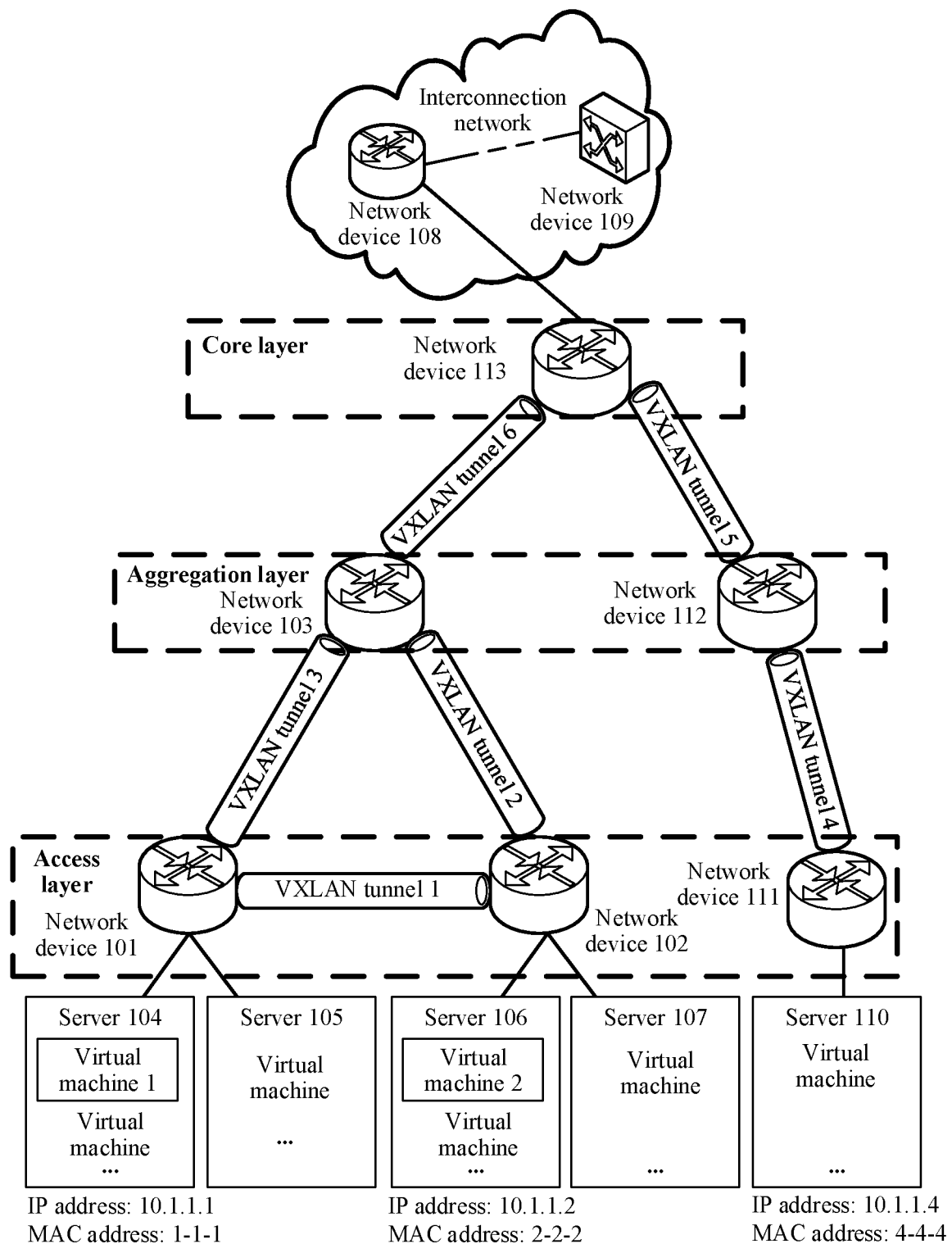
FIG. 13 is a simplified schematic structural diagram of another VXLAN according to an embodiment of this application.

For example, as shown in FIG. 13, a difference between a VXLAN and the VXLAN shown in FIG. 1 lies in that this VXLAN further includes a network device 111, a network device 112, and a network device 113. The access layer includes the network device 101, the network device 102, and the network device 111. The network device 111 is further connected to a server 110, and the server 110 includes a plurality of virtual machines. The aggregation layer includes the network device 103 and the network device 112. The core layer includes the network device 113. The network device 111 and the network device 112 establish a VXLAN tunnel 4. The network device 112 and the network device 113 establish a VXLAN tunnel 5. The network device 103 and the network device 113 establish a VXLAN tunnel 6.

The network device 113 accesses another network (for example, an interconnection network). For example, the network device 113 may be a gateway device in the VXLAN, and the network device 113 is connected to a network device 108 in the interconnection network. In this case, a packet in the VXLAN may be transmitted to a network outside the VXLAN by using the network device 113.

The network device 113 establishes a first-mode neighbor with each of the network device 103 and the network device 112. For example, the network device 103 is a spoke neighbor of the network device 113, and the network device 112 is a spoke neighbor of the network device 113. The network device 113 sends, to the network device 103, a default route and an IMET route of the network device 113 that are used to forward a service packet for the network device 101 and the network device 102. The network device 113 sends, to the network device 112, a default route and an IMET route that are used to forward a service packet for the network device 111.

The network device 101 and the network device 103 establish a first-mode neighbor. For example, the network device 101 is a spoke neighbor of the network device 103. The network device 103 forwards, to the network device 101, a default route and an IMET route that are from the network device 113 and that are used to forward a service packet for the network device 101.

The network device 102 and the network device 103 establish a first-mode neighbor. For example, the network device 102 is a spoke neighbor of the network device 103. The network device 103 forwards, to the network device 102, a default route and an IMET route that are from the network device 113 and that are used to forward a service packet for the network device 102.

In this way, both the network device 101 and the network device 102 store only the default route and the IMET route of the network device 113, but do not need to store a route of another network device in a VXLAN. This effectively reduces resource overheads and storage pressure of the customer edge node.

The network device 111 and the network device 112 establish a first-mode neighbor. For example, the network device 111 is a spoke neighbor of the network device 112. The network device 112 forwards, to the network device 111, a default route and an IMET route that are from the network device 113 and that are used to forward a service packet for the network device 111. In this way, the network device 111 stores only the default route and the IMET route of the network device 113, but do not need to store a route of another network device in a VXLAN. This effectively reduces resource overheads and storage pressure of the customer edge node.

The network device 101 advertises, to the network device 103, a MAC route and an IMET route that are obtained by the network device 101.

The network device 102 advertises, to the network device 103, a MAC route and an IMET route that are obtained by the network device 102.

The network device 103 advertises, to the network device 113, a MAC route and an IMET route that are obtained by the network device 103, the MAC route and the IMET route that are obtained by the network device 102, and the MAC route and the IMET route that are obtained by the network device 101. In a possible case, in addition to advertising the foregoing routes to the network device 113, the network device 103 may store the MAC route and the IMET route that are advertised by the network device 101, and the MAC route and the IMET route that are advertised by the network device 102. In this way, the network device 103 may also forward, by using the methods described in the foregoing method embodiments, a packet to be sent to the network device 101 or the network device 102. For example, the network device 103 may forward a packet sent by the server 104 to the server 106.

The network device 111 advertises, to the network device 112, a MAC route and an IMET route that are obtained by the network device 111. The network device 112 advertises, to the network device 113, a MAC route and an IMET route that are obtained by the network device 112, and the MAC route and the IMET route that are obtained by the network device 111. The network device 112 stores the MAC route and the IMET route that are advertised by the network device 111, to send, to the network device 111, a packet from another spoke neighbor (not shown in the figure) connected to the network device 112. For a route learning process, refer to the related descriptions in the foregoing embodiments.

The network device 113 stores a MAC route and an IMET route that are obtained by a network device at the access layer and a network device at the aggregation layer, to send a packet (for example, a unicast packet or a BUM packet) to the network device at the access layer or forward a packet sent by the network device at the access layer. For example, a path through which the virtual machine in the server 104 sends a packet to the virtual machine in the server 106 may be: the virtual machine in the server 104→the network device 101→the network device 103→the network device 102→the virtual machine in the server 106. Optionally, a path through which the virtual machine in the server 104 sends a packet to the virtual machine in the server 106 may alternatively be: the virtual machine in the server 104→the network device 101→the network device 103→the network device 113→the network device 103→the network device 102→the virtual machine in the server 106.

For another example, a path through which the virtual machine in the server 104 sends a packet to the virtual machine in the server 110 may be: the virtual machine in the server 104→the network device 101→the network device 103→the network device 113→the network device 112→the network device 111→the virtual machine in the server 110. Optionally, the network device 102 and the network device 111 may alternatively establish a VXLAN tunnel 7. If the network device 101 and the network device 102 store an address of the virtual machine in the server 110, a path through which the virtual machine in the server 104 sends a packet to the virtual machine in the server 110 may be: the virtual machine in the server 104→the network device 101→the network device 102→the network device 111→the virtual machine in the server 110.

For another example, a path through which the virtual machine in the server 110 sends a packet to the virtual machine in the server 106 may be: the virtual machine in the server 110→the network device 111→the network device 112→the network device 113→the network device 103→the network device 102→the virtual machine in the server 106.

For a packet forwarding process, refer to the related descriptions in the foregoing embodiments.

After receiving an ARP request sent by a virtual machine in a server, the network device 103 or the network device 112 may convert the ARP request into an ORF request, and then send the ORF request to the network device 113. The operation of converting the ARP request into the ORF request may also be combining some ARP requests and then converting the ARP requests into the ORF request. If the network device 113 stores a MAC route and an IMET route of a network device included in the access layer, and a MAC address of a device connected to the network device included in the access layer, the network device 113 may feed back the requested MAC address to a requester.

In addition, after receiving an ORF request sent by the network device 101 and an ORF request sent by the network device 102, the network device 103 may combine the ORF request sent by the network device 101 and the ORF request sent by the network device 102, to generate a new ORF request, and the network device 103 sends the new ORF request to the network device 113.

For example, the network device 101 sends a first ORF request, and the network device 102 sends a second ORF request. After receiving the first ORF request from the network device 101 and the second ORF request from the network device 102, the network device 103 generates a new ORF request, and sends the new ORF request to the network device 113.

The network device 113 records a MAC address 2-2-2 and a MAC address 4-4-4 in response to the new ORF request. The network device 113 feeds back the MAC address 2-2-2 and the MAC address 4-4-4 to the network device 103.

The network device 103 feeds back the MAC address 2-2-2 to the network device 101, and feeds back the MAC address 4-4-4 to the network device 102.

An example in which the network includes one aggregation layer is used in FIG. 13. In another possible application scenario, a plurality of aggregation layers may alternatively be disposed. An access layer and an aggregation layer, adjacent aggregation layers, or an aggregation layer and a core layer may establish a first-mode neighbor, to implement corresponding functions described in this application. For example, this is applicable to a large-scale networking scenario. In addition, for ease of understanding, in this embodiment, different network layers are described as an access layer, an aggregation layer, and a core layer. However, it may be understood that the foregoing names may alternatively be replaced with other descriptions with reference to an application scenario, or may be simply described as different network layers in a multi-layer networking manner. The different network layers may be used to implement different or same functions.

The foregoing embodiments describe the route learning process and the packet sending process for a unicast scenario and a broadcast scenario. A client (for example, the network device 101) and a server (for example, the network device 103) establish a first-mode neighbor, for example, a spoke-mode neighbor, so that the client and the server can respectively determine behavior of the client and the server in a route advertisement phase based on this-mode neighbor relationship, and complete corresponding service packet forwarding behavior based on an obtained route. This reduces route storage pressure of the client and the network device and save network running resources while implementing normal service packet forwarding.

Figure 14:
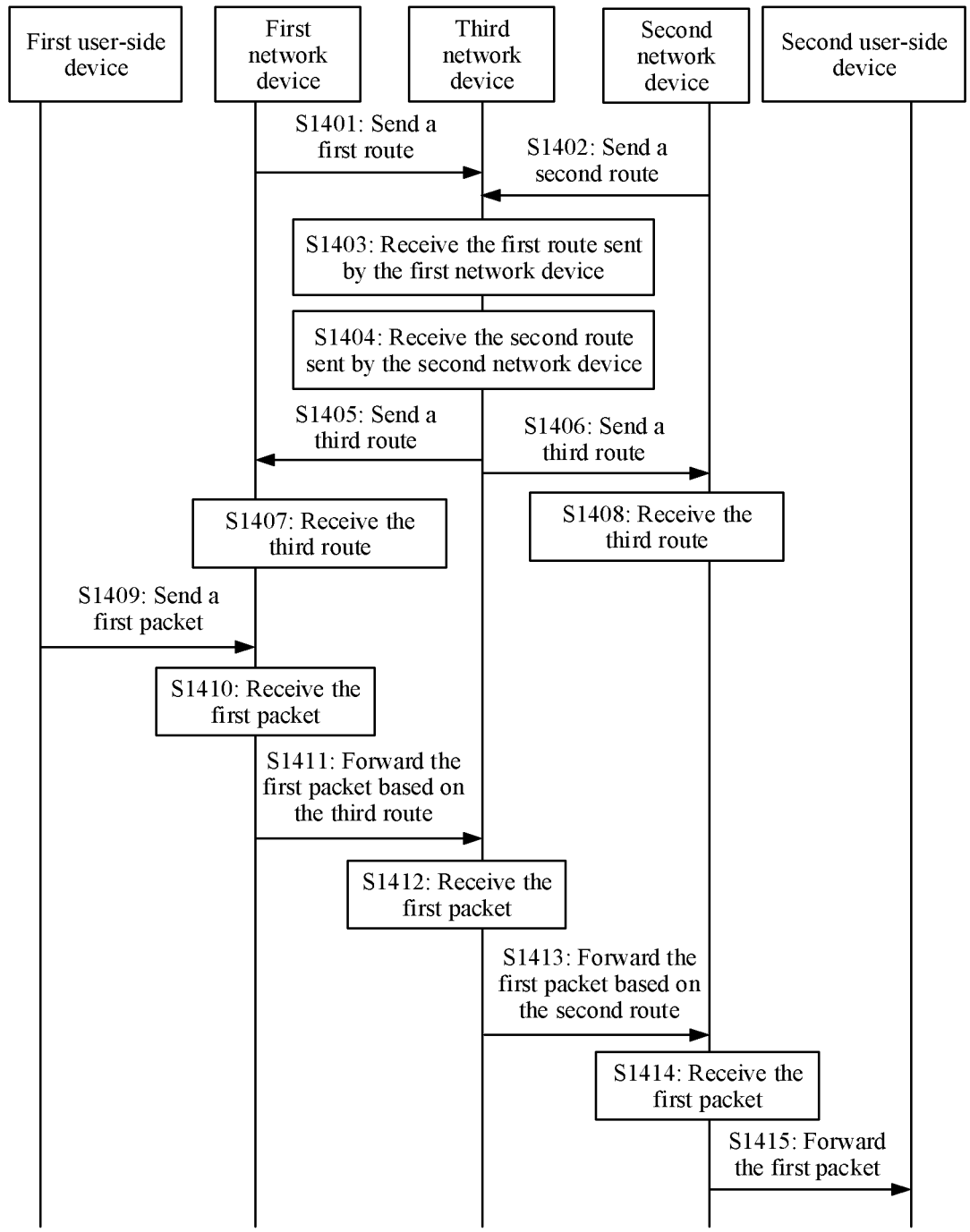
FIG. 14 is a flowchart of another data transmission method according to an embodiment of this application.

Subsequently, an embodiment of this application further provides a flowchart of a data transmission method. Herein, a first network device, a second network device, and a third network device are used as examples for description. The third network device establishes a first-mode neighbor with each of the first network device and the second network device, where the first-mode neighbor may be a spoke neighbor, or may be a neighbor that is defined in another form and that can implement a corresponding function provided in this embodiment of this application. The first network device is connected to a first user-side device. The second network device is connected to a second user-side device. As shown in FIG. 14, the method may include the following steps.

S1401: The first network device sends a first route to the third network device.

The first network device determines, based on stored information about a network device that establishes the spoke neighbor with the first network device, that the first network device is the first-mode neighbor of the third network device, and the first network device sends the first route to the third network device. The first route may be a MAC route or an IMET route of the first network device.

S1402: The second network device sends a second route to the third network device.

The second network device determines, based on stored information about a network device that establishes the spoke neighbor with the second network device, that the second network device is the first-mode neighbor of the third network device, and the second network device sends the second route to the third network device. The second route may be a MAC route or an IMET route of the second network device.

S1403: The third network device receives the first route sent by the first network device.

If the first route is the MAC route, after receiving the first route, the third network device records the first route in a unicast routing table. After receiving a unicast packet to be sent to a virtual machine connected to the first network device, the third network device may forward the unicast packet to the first network device based on the MAC route.

If the first route is the IMET route, after receiving the first route, the third network device records the first route in a broadcast routing table. After receiving a BUM packet, the third network device may forward the BUM packet to the first network device based on the IMET route.

S1404: The third network device receives the second route sent by the second network device.

If the second route is the MAC route, after receiving the second route, the third network device records the second route in a unicast routing table. After receiving a unicast packet to be sent to a virtual machine connected to the second network device, the third network device may forward the unicast packet to the second network device based on the MAC route.

If the second route is the IMET route, after receiving the second route, the third network device records the second route in a broadcast routing table. After receiving a BUM packet, the third network device may forward the BUM packet to the second network device based on the IMET route.

S1405: The third network device sends a third route to the first network device.

S1406: The third network device sends a third route to the second network device.

If the third route is a default route, the first network device or the second network device is instructed to forward a unicast packet to the third network device based on the third route.

If the third route is an IMET route, the first network device or the second network device instructs to forward a BUM packet to the third network device based on the third route.

S1407: The first network device receives the third route sent by the third network device.

S1408: The second network device receives the third route sent by the third network device.

Optionally, the third network device may alternatively send the third route to each of the first network device and second the network device, and then receive the first route sent by the first network device and the second route sent by the second network device. A sequence of S1401 to S1404 and a sequence of S1405 to S1408 are not limited in this embodiment.

If the first route is the MAC route, for detailed descriptions of S1401 to S1408, reference may be made to the descriptions of S201 to S213.

If the first route is the IMET route, for detailed descriptions of S1401 to S1408, reference may be made to the descriptions of S901 to S908.

After the first network device to the third network device learn the route, that is, after S1401 to S1408, the first network device to the third network device may forward a packet from a user-side device. The user-side device may be user equipment such as a user-side network device or a user host. The method further includes the following steps.

S1409: The first user-side device sends a first packet to the first network device.

If the first packet is a unicast packet, a header of the first packet includes a MAC address of the first user-side device and a MAC address of the second user-side device. The first packet is a packet sent by the first user-side device connected to the first network device to the second user-side device connected to the second network device.

If the first packet is a BUM packet, a header of the first packet includes a MAC address of the first user-side device and a broadcast address.

S1410: The first network device receives the first packet sent by the first user-side device.

S1411: The first network device forwards the first packet based on the third route.

If the first packet is a unicast packet, because the first network device does not find the MAC address of the second user-side device in a unicast routing table, the first network device forwards the first packet to the third network device by using the third route in an unknown unicast routing table.

If the first packet is a BUM packet, the first network device searches a broadcast routing table, and forwards the first packet to the third network device by using the third IMET route in the broadcast routing table.

The first network device may encapsulate the first packet by using UDP, to obtain a first VXLAN packet, and the first network device forwards the first VXLAN packet based on the third route.

S1412: The third network device receives the first packet sent by the first network device.

S1413: The third network device forwards the first packet to the second network device based on the second route.

The third network device may decapsulate the first VXLAN packet, determine the second route based on a destination address (the broadcast address or the MAC address of the second user-side device), and forward the first packet to the second network device based on the second route.

The third network device may encapsulate the first packet by using UDP, to obtain a second VXLAN packet, and the third network device forwards the second VXLAN packet based on the second route.

S1414: The second network device receives the first packet sent by the third network device.

S1415: The second network device forwards the first packet to the second user-side device connected to the second network device.

It may be understood that the second network device decapsulates the second VXLAN packet to obtain the first packet, and forwards the first packet to the second user-side device connected to the second network device.

If the first route is the MAC route, for detailed descriptions of S1409 to S1415, reference may be made to the descriptions of S401 to S407.

If the first route is the IMET route, for detailed descriptions of S1409 to S1415, reference may be made to the descriptions of S1101 to S1107.

Figure 15A:
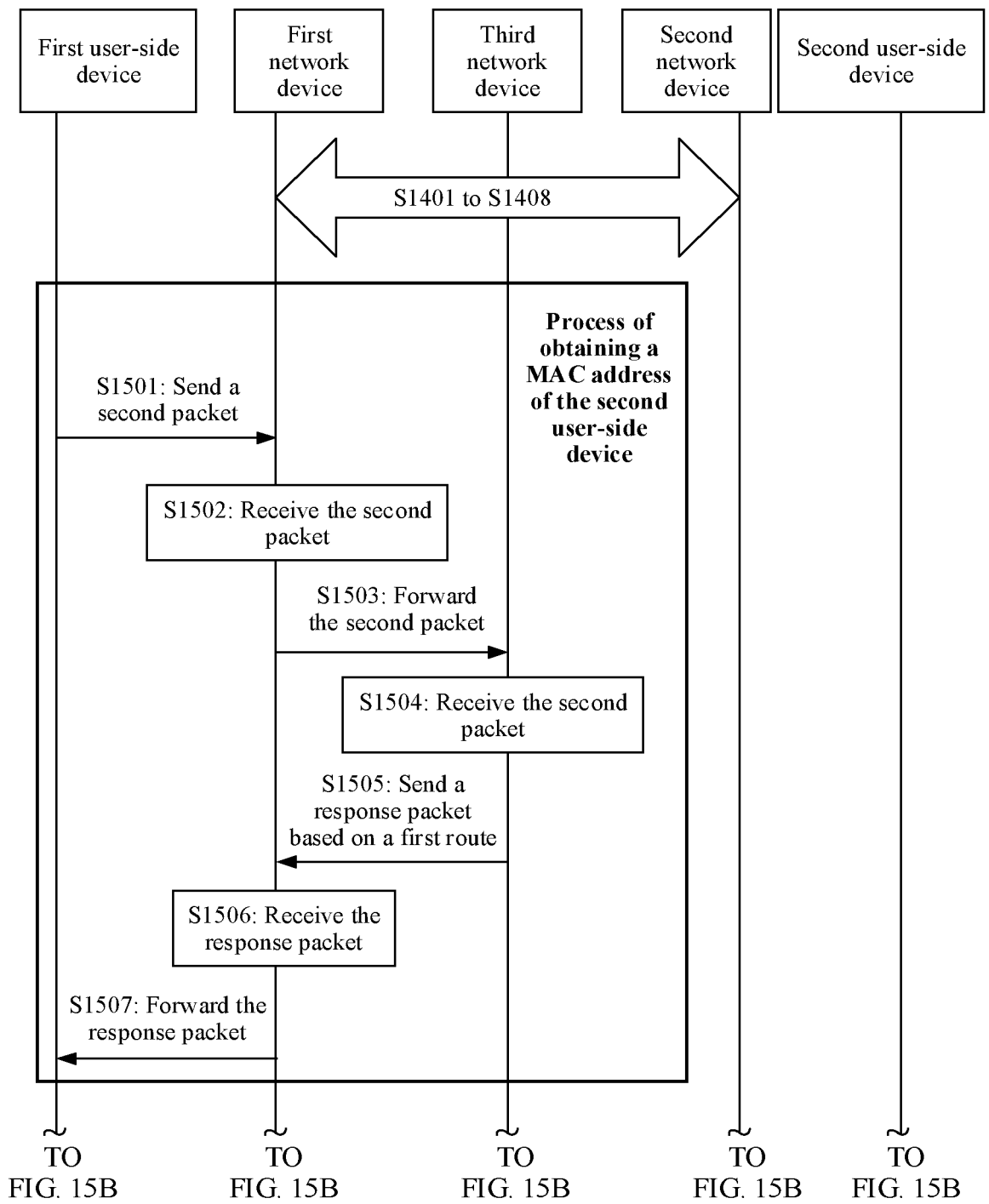
FIG. 15A and FIG. 15B are a flowchart of another data transmission method according to an embodiment of this application.
Figure 15B:
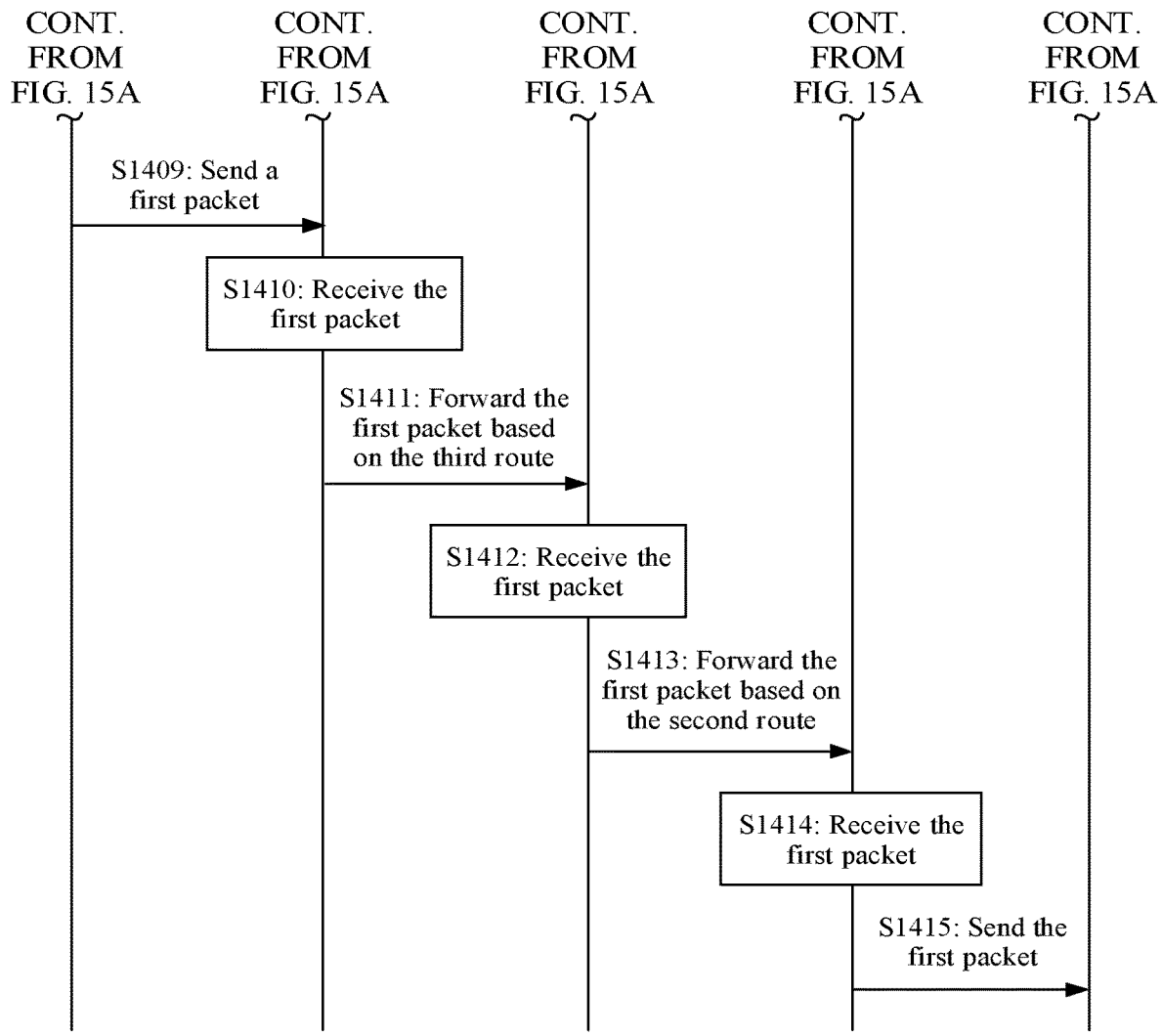

In a case, if the first user-side device does not know the MAC address of the second user-side device, the first user-side device sends an ARP request to obtain the MAC address of the second user-side device. FIG. 15A and FIG. 15B are a flowchart of a data transmission method according to an embodiment of this application. As shown in FIG. 15A and FIG. 15B, before S1409, the method further includes the following steps.

S1501: A first user-side device sends a second packet to a first network device.

The second packet is used to request a MAC address of a second user-side device. The second packet includes an IP address of the second user-side device. For example, the second packet may be an ARP packet.

S1502: The first network device receives the second packet sent by the first user-side device.

S1503: The first network device forwards the second packet to a third network device.

If the first network device stores the MAC address of the second user-side device, the first network device feeds back the MAC address of the second user-side device to the first user-side device. If the first network device does not store the MAC address of the second user-side device, the first network device may broadcast the second packet. If the third network device stores the MAC address of the second user-side device, the first network device may obtain the MAC address of the second user-side device from the third network device, and feed back the MAC address of the second user-side device to the first user-side device. Steps S1504 and S1505 are as follows.

S1504: The third network device receives the second packet sent by the first network device.

S1505: The third network device sends a response packet to the first network device based on a first route.

S1506: The first network device receives the response packet sent by the third network device.

S1507: The first network device forwards the response packet to the first user-side device.

In addition, the first network device may also generate an ORF request based on the second packet, and send the ORF request to the third network device, to request the MAC address of the second user-side device. For detailed descriptions of S1501 to S1507, refer to the descriptions of S601 to S607.

Further, the first network device sends the packet to the second user-side device based on the MAC address of the second user-side device. For details, refer to the descriptions of S1409 to S1415 in the foregoing embodiments. The details are not described herein again.

Therefore, the first network device and the second network device store only a default route or an IMET route to be sent to the third network device, and the third network device forwards the packet sent by the first network device, or one of the first network device and the second network device dynamically obtains, from the third network device based on a requirement, a route to a user-side device mounted on the other network device for packet forwarding. This reduces resource overheads and storage pressure of the first network device.

In addition, for example, a data transmission network needs to cover a relatively small area. Therefore, the first network device may be directly connected to the first user-side device, and the second network device may be directly connected to the second user-side device. For example, as shown in FIG. 1, the first network device is the network device 101, the second network device is the network device 102, and the third network device is the network device 103. For a route learning process between the network devices and a packet forwarding process between the network devices, refer to the related descriptions in the foregoing embodiments of the network device connection manner shown in FIG. 1.

For example, a data transmission network needs to cover a relatively large area. Therefore, the first network device may be indirectly connected to the first user-side device, and the second network device may be indirectly connected to the second user-side device. For example, as shown in FIG. 13, the first network device is the network device 103, the second network device is the network device 112, and the third network device is the network device 113. For a route learning process between the network devices and a packet forwarding process between the network devices, refer to the related descriptions in the foregoing embodiments shown in FIG. 13.

It may be understood that, to implement the functions in the foregoing embodiments, the network device includes a corresponding hardware structure and/or software module for performing each function. A person skilled in the art should be easily aware that units and method steps in the examples described with reference to the embodiments disclosed in this application can be implemented by hardware or a combination of hardware and computer software in this application. Whether a function is performed by hardware or hardware driven by computer software depends on particular application scenarios and design constraints of the technical solutions.

Figure 16:
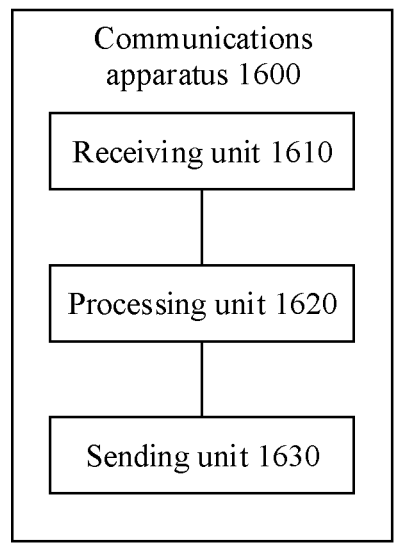
FIG. 16 is a structural diagram of a communications apparatus according to an embodiment of this application.

FIG. 16 is a schematic structural diagram of a possible communications apparatus according to an embodiment of this application. The communications apparatus may be configured to implement functions of the network device in the foregoing method embodiments. Therefore, beneficial effects of the foregoing method embodiments can also be implemented. In this embodiment of this application, the communications apparatus may be the network device 101, the network device 102, or the network device 103 shown in FIG. 1, FIG. 3, FIG. 5, FIG. 7, FIG. 8, FIG. 10, FIG. 12, or FIG. 13, or may be a module (for example, a hardware module such as a chip, a software module configured to implement a corresponding function, or a combination of some software and hardware modules) applied to the network device.

As shown in FIG. 16, the communications apparatus 1600 includes a receiving unit 1610, a processing unit 1620, and a sending unit 1630. The communications apparatus 1600 is configured to implement functions of the network device in the method embodiment shown in FIG. 2, FIG. 4, FIG. 6A and FIG. 6B, FIG. 9, FIG. 11, FIG. 14, or FIG. 15A and FIG. 15B.

When the communications apparatus 1600 is configured to implement functions of the network device 101 in the method embodiment shown in FIG. 2, the receiving unit

1610 may be configured to perform S204, and the sending unit 1630 may be configured to perform S206 and S211.

When the communications apparatus 1600 is configured to implement functions of the network device 102 in the method embodiment shown in FIG. 2, the receiving unit 1610 may be configured to perform S205, and the sending unit 1630 may be configured to perform S208 and S210.

When the communications apparatus 1600 is configured to implement functions of the network device 103 in the method embodiment shown in FIG. 2, the receiving unit 1610 may be configured to perform S207, S209, S212, and S213, the sending unit 1630 may be configured to perform S202 and S203, and the processing unit 1620 is configured to perform S201.

When the communications apparatus 1600 is configured to implement functions of the network device 101 in the method embodiment shown in FIG. 4, the receiving unit 1610 may be configured to perform S204 and S402, and the sending unit 1630 may be configured to perform S206, S211, and S403.

When the communications apparatus 1600 is configured to implement functions of the network device 102 in the method embodiment shown in FIG. 4, the receiving unit 1610 may be configured to perform S205 and S406, and the sending unit 1630 may be configured to perform S208, S210, and S407.

When the communications apparatus 1600 is configured to implement functions of the network device 103 in the method embodiment shown in FIG. 4, the receiving unit 1610 may be configured to perform S207, S209, S212, S213, and S404, and the sending unit 1630 may be configured to perform S202, S203, and S405.

When the communications apparatus 1600 is configured to implement functions of the network device 101 in the method embodiment shown in FIG. 6A and FIG. 6B, the receiving unit 1610 may be configured to perform S402, S602, and S606, and the sending unit 1630 may be configured to perform S403, S603, and S607.

When the communications apparatus 1600 is configured to implement functions of the network device 103 in the method embodiment shown in FIG. 6A and FIG. 6B, the receiving unit 1610 may be configured to perform S404 and S604, and the sending unit 1630 may be configured to perform S405 and S605.

When the communications apparatus 1600 is configured to implement functions of the network device 101 in the method embodiment shown in FIG. 9, the receiving unit 1610 may be configured to perform S907, and the sending unit 1630 may be configured to perform S901.

When the communications apparatus 1600 is configured to implement functions of the network device 102 in the method embodiment shown in FIG. 9, the receiving unit 1610 may be configured to perform S908, and the sending unit 1630 may be configured to perform S902.

When the communications apparatus 1600 is configured to implement functions of the network device 103 in the method embodiment shown in FIG. 9, the receiving unit 1610 may be configured to perform S903 and S904, and the sending unit 1630 may be configured to perform S905 and S906.

When the communications apparatus 1600 is configured to implement functions of the network device 101 in the method embodiment shown in FIG. 11, the receiving unit 1610 may be configured to perform S907 and S1106, and the sending unit 1630 may be configured to perform S901 and S1107.

When the communications apparatus 1600 may be configured to implement functions of the network device 102 in the method embodiment shown in FIG. 11, the receiving unit 1610 may be configured to perform S908 and S1102, and the sending unit 1630 may be configured to perform S902 and S1103.

When the communications apparatus 1600 may be configured to implement functions of the network device 103 in the method embodiment shown in FIG. 11, the receiving unit 1610 may be configured to perform S903, S904, and S1104, and the sending unit 1630 may be configured to perform S905, S906, and S1105.

When the communications apparatus 1600 may be configured to implement functions of the first network device in the method embodiment shown in FIG. 14, the receiving unit 1610 may be configured to perform S1407 and S1410, and the sending unit 1630 may be configured to perform S1401 and S1411.

When the communications apparatus 1600 may be configured to implement functions of the second network device in the method embodiment shown in FIG. 14, the receiving unit 1610 may be configured to perform S1408 and S1414, and the sending unit 1630 may be configured to perform S1402 and S1415.

When the communications apparatus 1600 may be configured to implement functions of the third network device in the method embodiment shown in FIG. 14, the receiving unit 1610 may be configured to perform S1403, S1404, and S1412, and the sending unit 1630 may be configured to perform S1405, S1406, and S1413.

When the communications apparatus 1600 may be configured to implement functions of the first network device in the method embodiment shown in FIG. 15A and FIG. 15B, the receiving unit 1610 may be configured to perform S1407, S1410, S1502, and S1506, and the sending unit 1630 may be configured to perform S1401, S1411, S1503, and S1507.

When the communications apparatus 1600 may be configured to implement functions of the third network device in the method embodiment shown in FIG. 15A and FIG. 15B, the receiving unit 1610 may be configured to perform S1403, S1404, S1412, and S1504, and the sending unit 1630 may be configured to perform S1405, S1406, S1413, and S1505.

For more detailed descriptions of the receiving unit 1610, the processing unit 1620, and the sending unit 1630, directly refer to the related descriptions in the method embodiment shown in FIG. 2, FIG. 4, FIG. 6A and FIG. 6B, FIG. 9, FIG. 11, FIG. 14, or FIG. 15A and FIG. 15B. Details are not described herein again.

Figure 17:
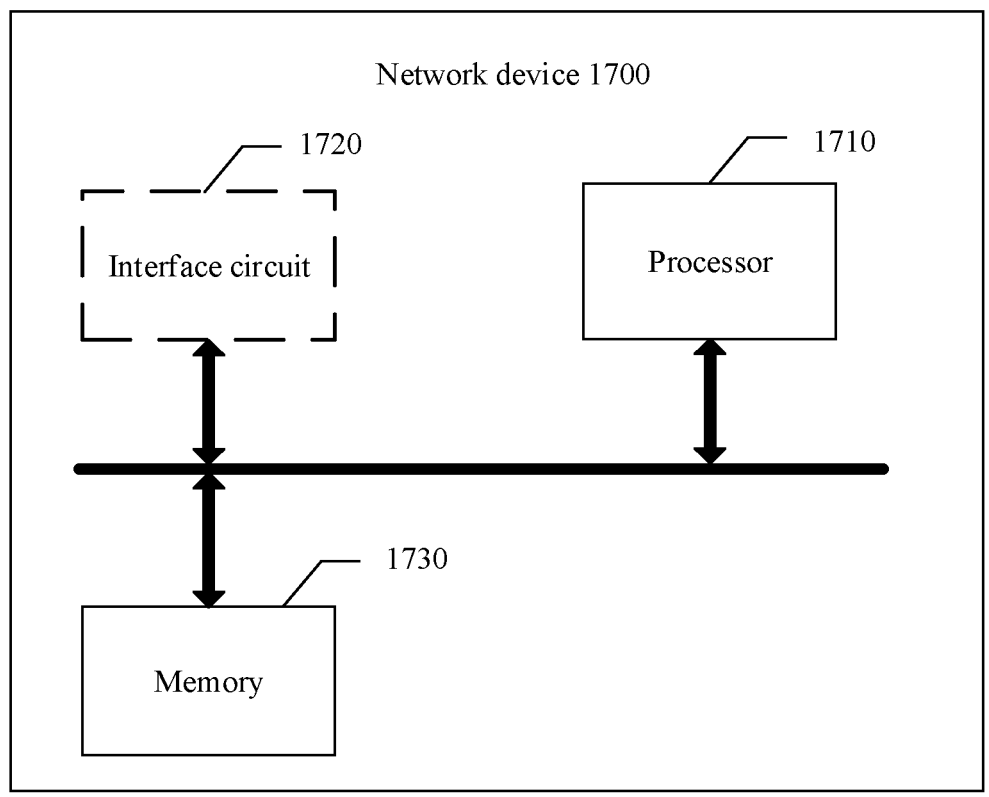
FIG. 17 is a structural diagram of a network device according to an embodiment of this application.

As shown in FIG. 17, a network device 1700 includes a processor 1710 and an interface circuit 1720. The processor 1710 and the interface circuit 1720 are coupled to each other. It may be understood that the interface circuit 1720 may be a transceiver or an input/output interface. Optionally, the network device 1700 may further include a memory 1730, configured to store instructions executed by the processor 1710, store input data required by the processor 1710 to run the instructions, or store data generated after the processor 1710 runs the instructions.

When the network device 1700 is configured to implement the method shown in FIG. 2, FIG. 4, FIG. 6A and FIG. 6B, FIG. 9, FIG. 11, FIG. 14, or FIG. 15A and FIG. 15B, the processor 1710 may be configured to perform a function of the processing unit 1620, and the interface circuit 1720 may be configured to perform functions of the receiving unit 1610 and the sending unit 1630.

Figure 18:
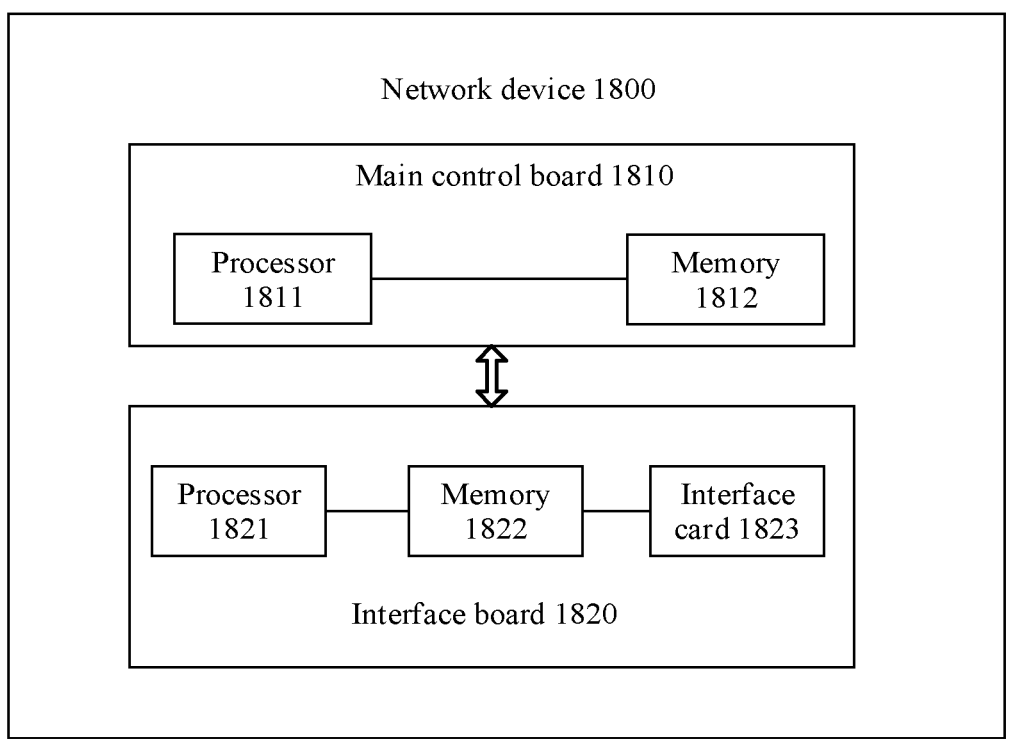
FIG. 18 is a structural diagram of another network device according to an embodiment of this application.

FIG. 18 is a schematic structural diagram of another network device according to an embodiment of this application. As shown in FIG. 18, the network device 1800 includes a main control board 1810 and an interface board 1820. The main control board 1810 includes a processor 1811 and a memory 1812. The interface board 1820 includes a processor 1821, a memory 1822, and an interface card 1823. The processor 1821 of the interface board 1820 is configured to invoke program instructions in the memory 1822 of the interface board 1820 to perform packet receiving and sending and route receiving and sending. The processor 1811 of the main control board 1810 is configured to invoke program instructions in the memory 1812 of the main control board 1810 to perform a corresponding processing function, for example, search for a route to forward a packet, and encapsulate a received packet to generate a VXLAN packet and decapsulate the VXLAN packet. For details, refer to the descriptions of the method shown in FIG. 2, FIG. 4, FIG. 6A and FIG. 6B, FIG. 9, FIG. 11, FIG. 14, or FIG. 15A and FIG. 15B.

It may be understood that the processor in the embodiments of this application may be a central processing unit (CPU), may be another general-purpose processor, a digital signal processor (DSP), an application-specific integrated circuit (ASIC), a field-programmable gate array (FPGA), another programmable logical device, a transistor logical device, a hardware component, or any combination thereof. The general-purpose processor may be a microprocessor or any conventional processor.

The method steps in the embodiments of this application may be implemented in a hardware manner or may be implemented in a manner of executing a software instruction by a processor. The software instruction may include a corresponding software module. The software module may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor, so that the processor can read information from the storage medium and can write information into the storage medium. Certainly, the storage medium may alternatively be a component of the processor. The processor and the storage medium may be located in an ASIC. In addition, the ASIC may be located in a network device or a terminal device. Certainly, the processor and the storage medium may alternatively exist in the network device or the terminal device as discrete assemblies.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, a network device, user equipment, or another programmable apparatus. The computer programs or the instructions may be stored in a computer readable storage medium, or may be transmitted from a computer readable storage medium to another computer readable storage medium. For example, the computer programs or the instructions may be transmitted from a website, computer, server, or data center to another website, computer, server, or data center in a wired or wireless manner. The computer readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following cases: only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

In the specification, claims, and accompanying drawings of this application, the terms such as "first", "second", and "third" are intended to distinguish between different objects but do not limit a particular sequence.

In the embodiments of this application, the words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of words such as "example" or "for example" is intended to present a related concept in a specific manner.

It may be understood that various numbers in the embodiments of this application are merely used for differentiation for ease of description, and are not used to limit the scope of the embodiments of this application. Sequence numbers of the foregoing processes do not mean execution sequences. The execution sequences of the processes should be determined based on functions and internal logic of the processes.

What is claimed is:

1. An apparatus, comprising:
a memory configured to store instructions; and
one or more processors coupled to the memory and configured to execute the instructions to:
establish a spoke-mode neighbor with each of a first network device of an Ethernet virtual private network (EVPN) system and a second network device of the EVPN system; and
send, to the first network device and based on the first network device being the spoke-mode neighbor of the apparatus, a first route, wherein the first route is an unknown media access control route (UMR), and wherein the UMR is configured to instruct the first network device to forward, to the apparatus and based on the first route, a first packet to be sent to a second user-side device coupled to the second network device.

2. The apparatus of claim 1, wherein the one or more processors are further configured to execute the instructions to:
receive, through the first network device and using the first route, the first packet; and
forward, to the second network device, the first packet.

3. The apparatus of claim 2, wherein the one or more processors are further configured to execute the instructions to:
receive, from the second network device, a second route instructing the apparatus to forward the first packet to the second user-side device; and
forward, to the second network device using the second route, the first packet.

4. The apparatus of claim 1, wherein before sending the first route, the one or more processors are further configured to execute the instructions to receive, from the first network device, a second route instructing the apparatus to forward, to a first user-side device coupled to the first network device, a second packet.

5. The apparatus of claim 1, wherein the one or more processors are further configured to execute the instructions to generate, based on the first network device being the spoke-mode neighbor of the apparatus, the first route, and wherein the first route further instructs the first network device to forward, to the apparatus using the first route, the first packet to the second user-side device.

6. The apparatus of claim 1, wherein the UMR comprises a default route.

7. The apparatus of claim 6, wherein the default route comprises a full zero MAC address.

8. A method, comprising:
establishing a spoke-mode neighbor with each of a first network device of an Ethernet virtual private network (EVPN) system and a second network device of the EVPN system; and
sending, to the first network device and based on the first network device being the spoke-mode neighbor of an apparatus, a first route, wherein the first route is an unknown media access control route (UMR), and wherein the UMR is configured to instruct the first network device to forward, to the apparatus and based on the first route, a first packet to be sent to a second user-side device coupled to the second network device.

9. The method of claim 8, further comprising:
receiving, through the first network device and using the first route, the first packet; and
forwarding, to the second network device, the first packet.

10. The method of claim 9, further comprising:
receiving, from the second network device, a second route instructing the apparatus to forward the first packet to the second user-side device; and
forwarding, to the second network device using the second route, the first packet.

11. The method of claim 8, wherein before sending the first route, the method further comprises receiving, from the first network device, a second route instructing the apparatus to forward, to a first user-side device coupled to the first network device, a second packet.

12. The method of claim 8, further comprising generating, based on the first network device being the spoke-mode neighbor of the apparatus, the first route, wherein the first route further instructs the first network device to forward, to the apparatus using the first route, the first packet to the second user-side device.

13. The method of claim 8, wherein the UMR comprises a default route.

14. The method of claim 13, wherein the default route comprises a full zero MAC address.

15. A computer program product comprising instructions stored on a non-transitory computer-readable medium that, when executed by one or more processors, cause an apparatus to:
establish a spoke-mode neighbor with each of a first network device of an Ethernet virtual private network (EVPN) system and a second network device of the EVPN system; and
send, to the first network device and based on the first network device being the spoke-mode neighbor of the apparatus, a first route, wherein the first route is an unknown media access control route (UMR), and wherein the UMR is configured to instruct the first network device to forward, to the apparatus and based on the first route, a first packet to be sent to a second user-side device coupled to the second network device.

16. The computer program product of claim 15, wherein the one or more processors are further configured to execute the instructions to:
receive, through the first network device and using the first route, the first packet; and
forward, to the second network device, the first packet.

17. The computer program product of claim 16, wherein the one or more processors are further configured to execute the instructions to:
receive, from the second network device, a second route instructing the apparatus to forward the first packet to the second user-side device; and
forward, to the second network device using the second route, the first packet.

18. The computer program product of claim 15, wherein before sending the first route, the one or more processors are further configured to execute the instructions to receive, from the first network device, a second route instructing the apparatus to forward, to a first user-side device coupled to the first network device, a second packet.

19. The computer program product of claim 15, wherein the one or more processors are further configured to execute the instructions to generate, based on the first network device being the spoke-mode neighbor of the apparatus, the first route, and wherein the first route further instructs the first network device to forward, to the apparatus using the first route, the first packet to the second user-side device.

20. The computer program product of claim 15, wherein the UMR comprises a default route.

* * * * *